(12) United States Patent
Mochrie et al.

(10) Patent No.: US 11,741,502 B2
(45) Date of Patent: Aug. 29, 2023

(54) SYSTEM AND METHODS FOR SYMBIOTIC DISPLAY OF ADS ON MOBILE DEVICES

(71) Applicant: Airo.Life Inc., Guelph (CA)

(72) Inventors: Douglas Mochrie, Guelph (CA); Jeff Thompson, Guelph (CA); Martin Guthrie, Guelph (CA)

(73) Assignee: Ohana Corp, Guelph (CA)

( * ) Notice: Subject to any disclaimer, the term of this patent is extended or adjusted under 35 U.S.C. 154(b) by 0 days.

(21) Appl. No.: 17/591,484

(22) Filed: Feb. 2, 2022

(65) Prior Publication Data
US 2022/0245675 A1     Aug. 4, 2022

Related U.S. Application Data

(60) Provisional application No. 63/145,353, filed on Feb. 3, 2021.

(51) Int. Cl.
*G06Q 30/0251*     (2023.01)

(52) U.S. Cl.
CPC ..... *G06Q 30/0267* (2013.01); *G06Q 30/0256* (2013.01); *G06Q 30/0261* (2013.01)

(58) Field of Classification Search
None
See application file for complete search history.

(56) References Cited

U.S. PATENT DOCUMENTS

| | | | |
|---|---|---|---|
| 7,844,491 | B1 | 11/2010 | Haitsuka et al. |
| 8,712,902 | B2 | 4/2014 | Jobs et al. |
| 8,744,951 | B2 | 6/2014 | Jobs et al. |
| 8,799,077 | B2 | 8/2014 | Flake et al. |
| 2002/0024948 | A1 | 2/2002 | Pendse |
| 2005/0215238 | A1 | 9/2005 | Macaluso |
| 2008/0057915 | A1 | 3/2008 | Lahtiranta et al. |
| 2009/0327032 | A1* | 12/2009 | Gunawardana .... G06Q 30/0243 705/14.42 |

(Continued)

FOREIGN PATENT DOCUMENTS

WO     2019178690 A1     9/2019

OTHER PUBLICATIONS

F. Brian Heater, "Amazon is now subsidizing the Moto G and other smartphones with on-screen ads", <URL: https://techcrunch.com/2016/06/29/amazon-prime-smartphones/?guccounter=1&guce_referrer=aHR0cHM6Ly93d3cuZ29vZ2xlLmNvbS8&guce_referrer_sig=AQAAAAuROcRXb3fVvRf4YgHbGgq1Ra-CJI (Year: 2016).*

*Primary Examiner* — Sam Refai
(74) *Attorney, Agent, or Firm* — Own Innovation Inc.; James W. Hinton

(57) ABSTRACT

Devices for symbiotic display of ads on mobile devices are provided. A mobile device has a display screen that includes an ad display for displaying ad content and an operating system display for operating system and applications. Ads are constantly displayed on the ad display independent to the content displayed on the operating system display. The display screen may have an aspect ratio of 18:9 with a 2:9 ad display and a 16:9 operating system display. The ad display and operating system display may be separate touch screens that are contiguous or a single touch screen that is divided into two or more distinct displays as a function of an operating system or application. The ad display may be in an auxiliary display device connected to the mobile device. A system and method for applying symbiotic targeted advertising is also provided.

16 Claims, 17 Drawing Sheets

(56) References Cited

U.S. PATENT DOCUMENTS

| | | | |
|---|---|---|---|
| 2011/0143769 A1* | 6/2011 | Jones | H04M 1/7246 |
| | | | 455/566 |
| 2011/0145059 A1* | 6/2011 | Baluja | G06Q 30/02 |
| | | | 705/14.57 |
| 2012/0290397 A1 | 11/2012 | Cortegiano et al. | |
| 2014/0220927 A1 | 8/2014 | Girard et al. | |
| 2014/0344055 A1 | 11/2014 | Sanghavi et al. | |
| 2014/0365302 A1* | 12/2014 | Walker | H04L 43/045 |
| | | | 705/14.53 |
| 2015/0039440 A1* | 2/2015 | Doumet | G06Q 30/0267 |
| | | | 705/14.64 |
| 2017/0353758 A1 | 12/2017 | Senew | |
| 2018/0219987 A1 | 8/2018 | Pantel | |
| 2018/0268777 A1 | 9/2018 | Kim et al. | |
| 2018/0321892 A1* | 11/2018 | Kim | G06F 1/1647 |

* cited by examiner

SYSTEM AND METHODS FOR SYMBIOTIC DISPLAY OF ADS ON MOBILE DEVICES

TECHNICAL FIELD

The following relates generally to mobile devices and mobile device software, and more particularly to a system, method and devices for displaying an advertisement, with operating system integration, outside the confines of an application.

INTRODUCTION

People tend to their mobile devices and/or view their screens frequently, often by habit. Each time a person views a mobile device screen there is an opportunity to capitalize on the tendency of the user to view the screen to provide media content or advertisements.

Presently, when software developers of software and/or mobile applications (hereafter "apps") that run on mobile devices wish to display advertisements (both banner ads and search ads), they face one significant restriction: they can generally only display ads within the confines of the app itself as shown on the device, and provided the app is open. Because of the limited screen size of many mobile devices (16:9 aspect ratio or smaller for most mobile devices), this constraint increases clutter within the app from the user perspective, causing user frustration and forcing ads to be displayed in small and confined areas of the app. This, in turn, decreases the quality and appeal of this form of mobile advertising in the eyes of the advertisers, thereby driving down the value of such advertising and negatively impacting revenues earned by app developers. Furthermore, revenues earned by app developers are limited because ads are no longer seen by users once the apps are closed on the device.

To illustrate the problem of displaying mobile ads through an app on a mobile device, reference is made to FIG. 1. FIG. 1 is a diagram of a mobile device 100, for example, a smart phone or tablet, having a screen 102. The screen 102 has the conventional aspect ratio of 16:9. The mobile device 100 executes an app whose content is displayed in a primary screen area 104 of the screen 102. Ads displayed on the device 100, via the app, are displayed in a secondary screen area 106, often confined to a narrow area at the bottom of the screen 102 or along one of the sides of the screen 102. The secondary screen area 106 is relatively small compared to the primary screen area 104 and thus not much of the screen 102 area is available to effectively display ads.

Existing mobile ad delivery systems attempt to improve engagement with potential customers, appeal to advertisers, and increase revenues to app developers by displaying longer, larger, and invasive ads, such as full-screen and video ads within the apps. These types of ads take up the entire display area of the app such that the user only sees (or mostly sees) only the ad at some point when using the app. For example, a full screen ad may take up the entire primary screen area 104 and secondary screen area 106 in FIG. 1. Furthermore, displaying a full screen ad takes time and prevents displaying the app content while the ad is displayed, thereby slowing down access to/use of the app. Also, the presence of adds in an app may make the app appear too ad-intensive or ad-centric thereby pushing users away from installing and using the app.

The collection and aggregation of information from mobile devices have far ranging implications. An issue is the anonymous collecting and selling of user information (i.e., metadata, search results, location data, etc.) by app developers and/or device manufacturers. Sometimes the collection of user data is done without consent of the user and in violation of privacy law.

Accordingly, in light of the drawbacks with regard to current mobile app ad display techniques, it would be desirable to be able to display ads and media content in a manner that is non-intrusive, engaging, and visible and are seen as beneficial to all entities involved in the process. Further, there is a need for a method to collect user information that is mutually beneficial to all parties, to target media and advertisements with significant penetration in comparison to passive media and advertising methods.

SUMMARY

In one aspect of the present invention, a method of displaying a targeted ad on a mobile device is as described. The method comprises: storing a plurality of advertisements, wherein each advertisement is tagged with one or more ad keywords; receiving consent to collect of user information, location data and search keywords from a mobile device; receiving a request for targeted advertisements from the mobile device, wherein the request includes the user information, and at least one of location data or one or more search keywords; identifying one or more targeted advertisements from the plurality of by matching ad keywords to the user information, location data or search keywords; sending the targeted advertisements to the mobile display, wherein the mobile device presents the targeted advertisements to a user; and storing metrics of user interaction with the targeted advertisement.

In another aspect of the present invention, a mobile device is provided. The mobile device includes a display having an aspect ratio of 18:9 that is generally larger than the typical aspect ratio of 16:9. This allows for a 2:9 ad segment of the display to be used to show ads continuously, while having the remaining 16:9 segment of the display as a standard display for displaying the operating system or apps. The mobile device may be used to display ads constantly in the ad segment of the display independent of the apps and operating system installed on the device. The device may thus be used to display "non-app generated" ads outside the confines of an app.

In another aspect, a mobile device having a first screen and a second screen is provided. The first screen is used for displaying operating system and application content and the second screen is used for displaying advertisements. The mobile device is configured to simultaneously present one or more advertisements on the second screen and display the content on the first screen, wherein the advertisements are presented on the second screen independent of the content displayed on the first screen.

In another aspect, a mobile device having a first screen is connected to an auxiliary display device having a second screen. The first screen is used for displaying operating system and application content and the second screen is used for displaying advertisements independent of the content on the first screen. Ad content may be synchronized from the mobile device to local storage on the auxiliary display device when a connection between the mobile device and the auxiliary display device is established.

The mobile device is further configured to record consent to collect user information, location data and search keywords entered by a user of the mobile device; send the user information location data and search keywords to a backend system over a wireless network; and download one or more advertisements from the backend system, wherein the one or more advertisements are matched to the user information, location data or search keywords.

According to an embodiment, the mobile device may be further configured to send a user response to the advertisement to the backend system; download related information to the advertisement from the backend system based on the user response; and present the related information on either the first screen or the second screen.

Other aspects and features will become apparent to those ordinarily skilled in the art, upon review of the following description of some exemplary embodiments.

BRIEF DESCRIPTION OF THE DRAWINGS

The drawings included herewith are for illustrating various examples of articles, methods, and apparatuses of the present specification. In the drawings.

DETAILED DESCRIPTION

Figure 1:
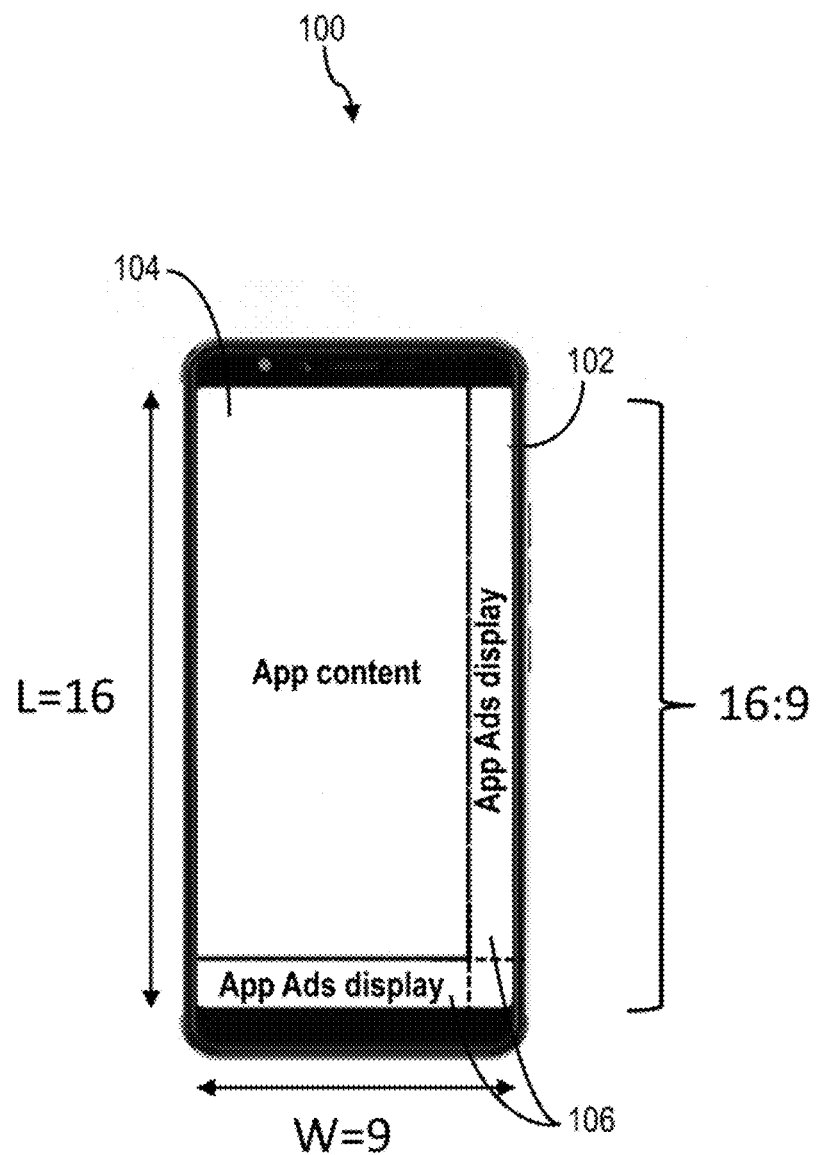
FIG. 1 is a diagram of the conventional technique of displaying an ad within an app on a mobile device.

Various apparatuses or processes will be described below to provide an example of each claimed embodiment. No embodiment described below limits any claimed embodiment and any claimed embodiment may cover processes or apparatuses that differ from those described below. The claimed embodiments are not limited to apparatuses or processes having all of the features of any one apparatus or process described below or to features common to multiple or all of the apparatuses described below.

One or more systems described herein may be implemented in computer programs executing on programmable computers, each comprising at least one processor, a data storage system (including volatile and non-volatile memory and/or storage elements), at least one input device, and at least one output device. For example, and without limitation, the programmable computer may be a programmable logic unit, a mainframe computer, server, and personal computer, cloud-based program or system, laptop, personal data assistance, cellular telephone, smartphone, or tablet device.

Each program is preferably implemented in a high-level procedural or object-oriented programming and/or scripting language to communicate with a computer system. However, the programs can be implemented in assembly or machine language, if desired. In any case, the language may be a compiled or interpreted language. Each such computer program is preferably stored on a storage media or a device readable by a general or special purpose programmable computer for configuring and operating the computer when the storage media or device is read by the computer to perform the procedures described herein.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described (in the disclosure and/or in the claims) in a sequential order, such processes, methods and algorithms may be configured to work in alternate orders. In other words, any sequence or order of steps that may be described does not necessarily indicate a requirement that the steps be performed in that order. The steps of processes described herein may be performed in any order that is practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

Reference herein to "ad" or "ads", means digital electronic advertisement or media content. The digital ad advertises or promotes a product or service. The digital ad comprises digital content or media capable of being rendered in a display and/or played through speakers. The digital ad may include audio, images, video, text elements, or a combination thereof, as well as other electronic data needed for the rendering of such content.

While certain aspect ratios are referred to herein, it is to be understood that such aspect ratios are merely examples based on standard or conventional aspect ratios of current mobile devices. Other aspect ratios are contemplated.

Figure 2A:
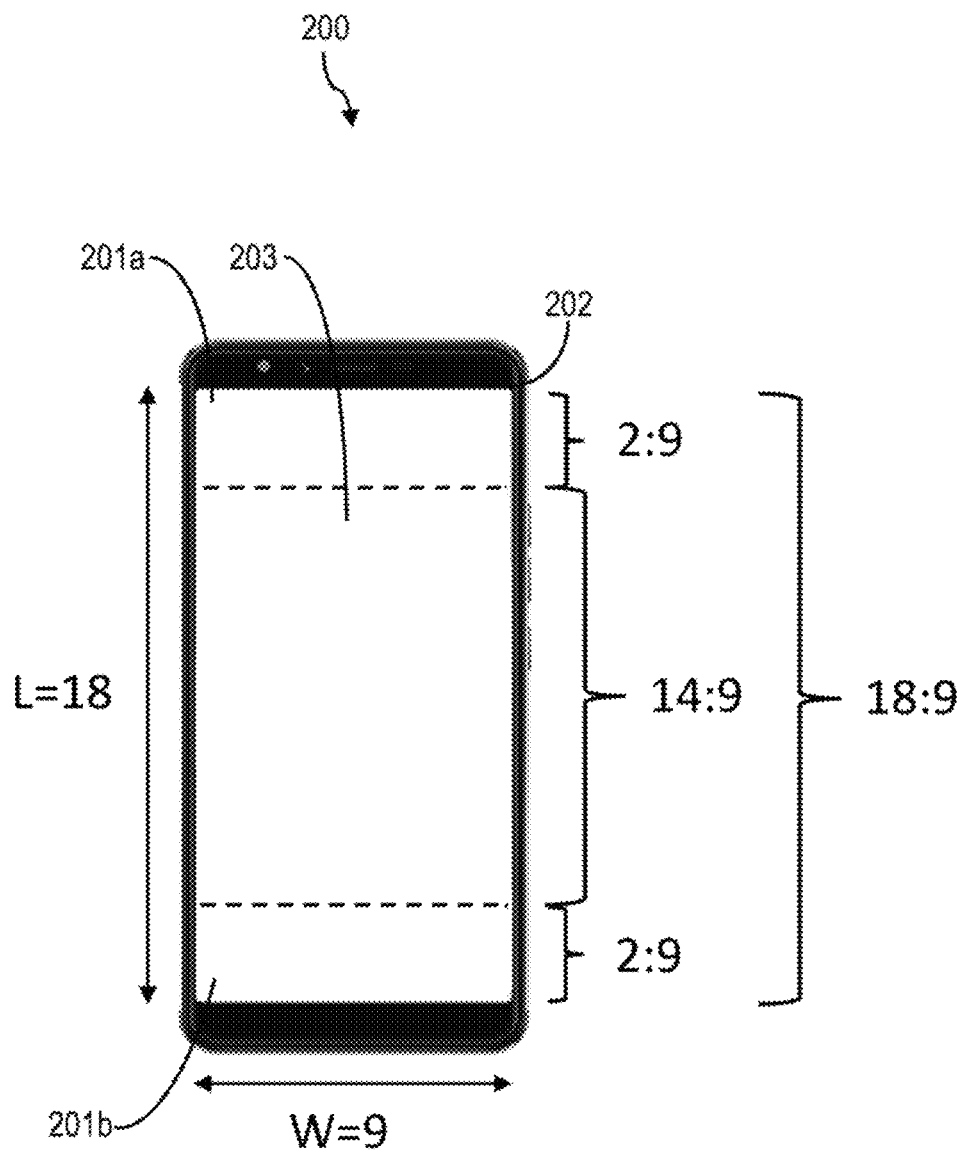
FIG. 2A is a diagram of mobile device, according to an embodiment.

Referring to FIG. 2A, illustrated therein is a mobile device 200, according to an embodiment. The device 200 may be a smart phone or tablet. The device 200 includes a touch display interface 202. The display 202 has a length-to-width ratio (aspect ratio) of 18:9. The aspect ratio of the display 202 is generally larger than most conventional smart phones displays that typically have an aspect ratio of 16:9. In other embodiments, the display 202 may have another aspect ratio.

The display 202 may be divided into end segments 201a and 201b, and a middle segment 203. The end segments 201a, 201b have an aspect ratio of 2:9 and the middle segment 103 has an aspect ratio of 14:9. The segments 201a, 201b, 203 may be separate contiguous displays (i.e., separate touch screens that are positioned adjacent to each other) or may be a single display that is segmented by an operating system running software as described below with reference to FIG. 2G. While "end" and "middle" are used to term the segments 201a, 201b, 203 it is to be understood that in other embodiments, the multiple displays or display segments 201a, 201b, 203 may have another configuration/orientation with respect to one another within the overall confines of the display 202 (see FIGS. 2B-2D).

The segmenting of the display 202 allows for the middle segment 203 to be used in concert with one of the end segments 201a, 201b to form a combined display having an aspect ratio of 16:9 that is typical of most smart phones. The remaining end segment 201a, 201b may then be used to display ads continuously while maintaining a normal 16:9 display on the balance of the display 202 (via the segment 203 and one of the segments 201a, 201b).

Figure 2B:
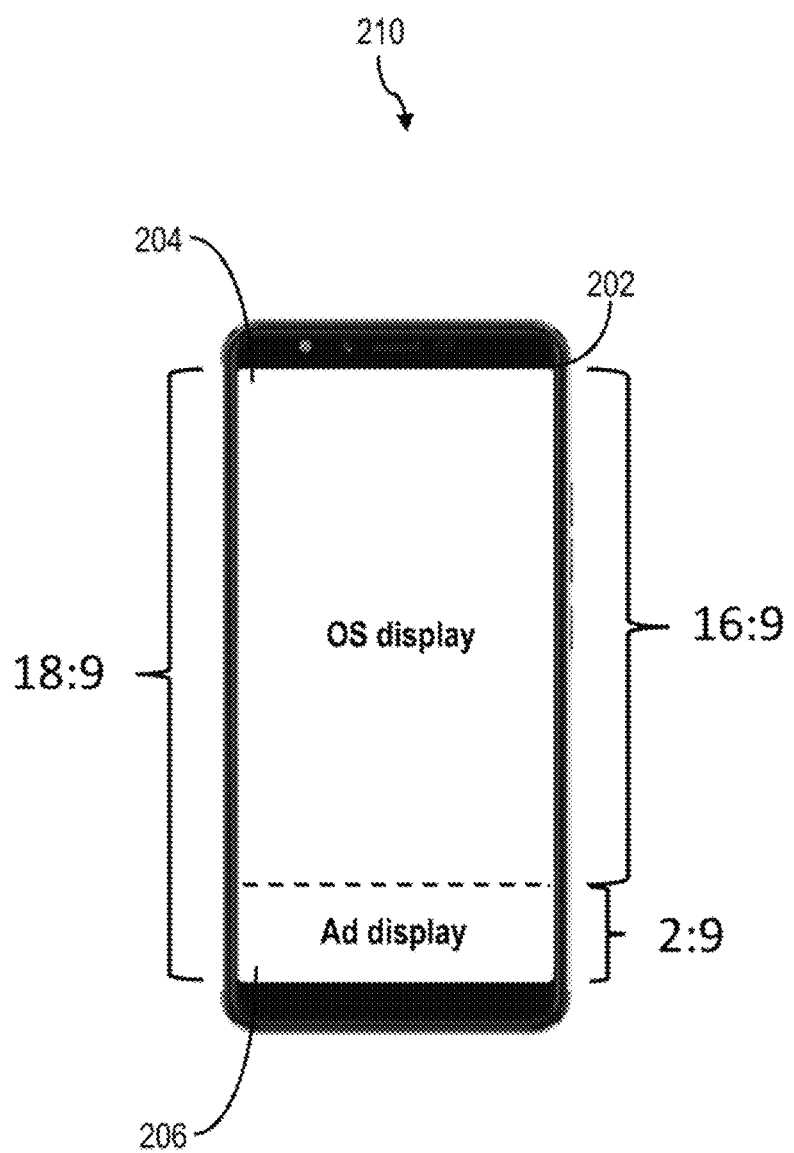
FIGS. 2B-2D are diagrams of mobile devices displaying ads and OS content, according to several embodiments.
Figure 2C:
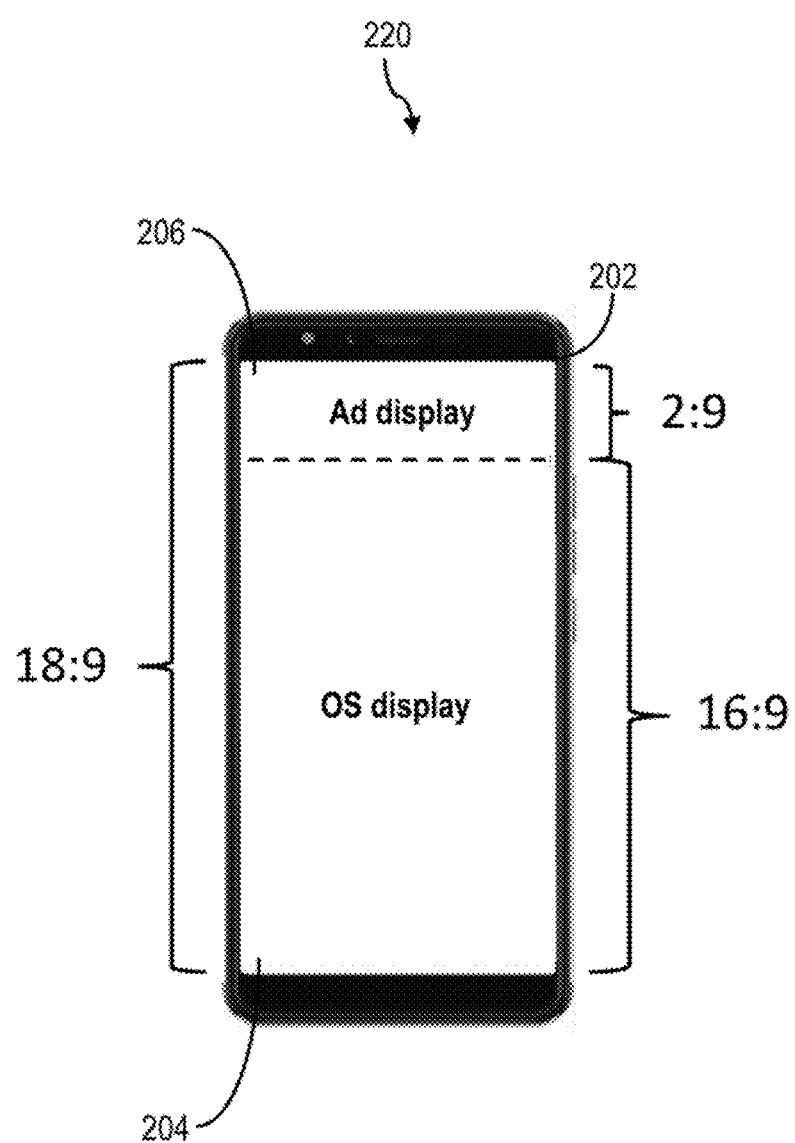

Referring to FIGS. 2B and 2C, illustrated therein are diagrams of mobile devices 210, 220, according to several embodiments. The devices 210, 220 include an OS display 204 and an ad display 206. As noted above, the OS display 204 and the ad display 206 may be separate contiguous displays or may be a single display 202 that is segmented by the operating system running on the devices 210, 220.

The OS display 204 is used to display content generated by an operating system (e.g., Android, iOS, etc.) and/or apps that are running on the devices 210, 220. The OS display 204 has an aspect ratio of 16:9 and has the appearance (in size and dimensions) of a conventional smart phone display.

Figure 2D:
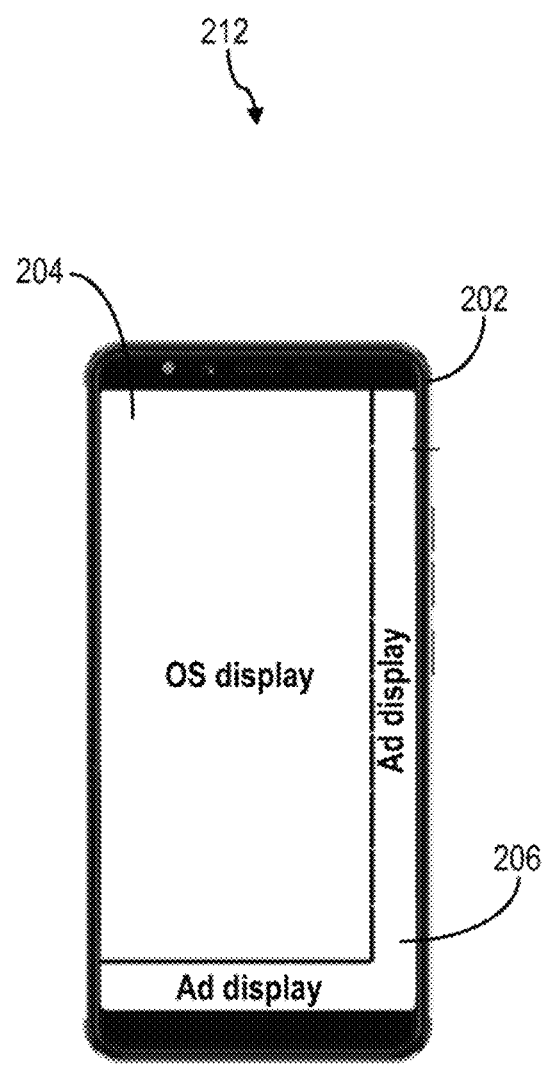

Referring to FIG. 2D, illustrated therein is a diagram of a mobile device 212, according to an embodiment. The device 212 is substantially similar to the devices 210, 220 in FIGS. 2B and 2C and includes a display 202 that is segmented into an OS display 204 and an ad display 206. The ad display 206 occupies space below and to the side of the OS display 204.

Figure 2E:
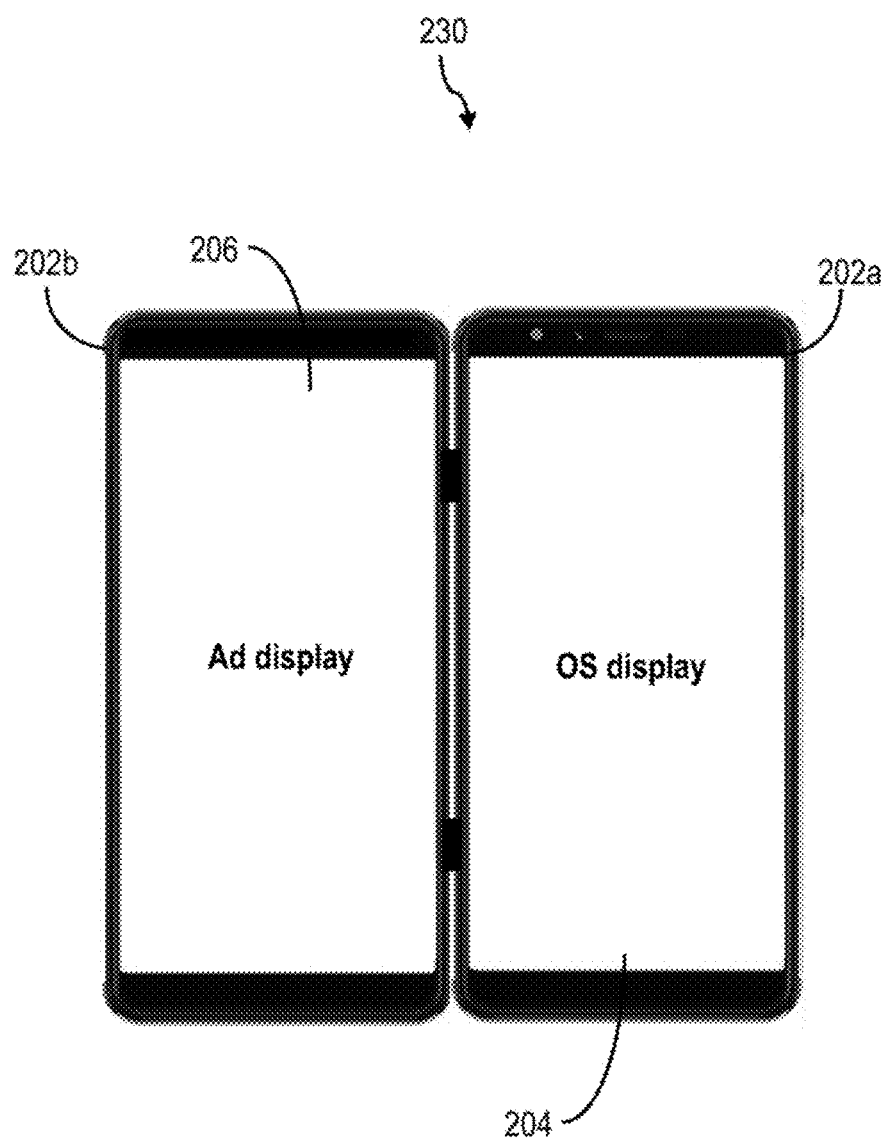
FIG. 2E is a diagram of a dual screen mobile device displaying ads and OS content, according to an embodiment.

Referring to FIG. 2E, illustrated therein is a diagram of a dual screen mobile device 230, according to an embodiment. The dual screen device 230 includes a primary display 202a attached to a secondary display 202b. The entirety of the primary display 202a is used for the OS display 204, and the entirety of the secondary display may be used for the ad display 206.

Figure 2F:
FIG. 2F is a diagram of a mobile device shown in relation to a peripheral for displaying ad content, according to an embodiment.

Referring to FIG. 2F, illustrated therein is a diagram of a mobile device 240, according to another embodiment. The device 240, includes the display 202. The entirety of the display 202 is used for the OS display 204. The device 240 is connected to a peripheral 208 that includes the ad display 206. The peripheral 208 may be a case or attachment, or dongle for the device 240, that incorporates the ad display 206.

Figure 2G:
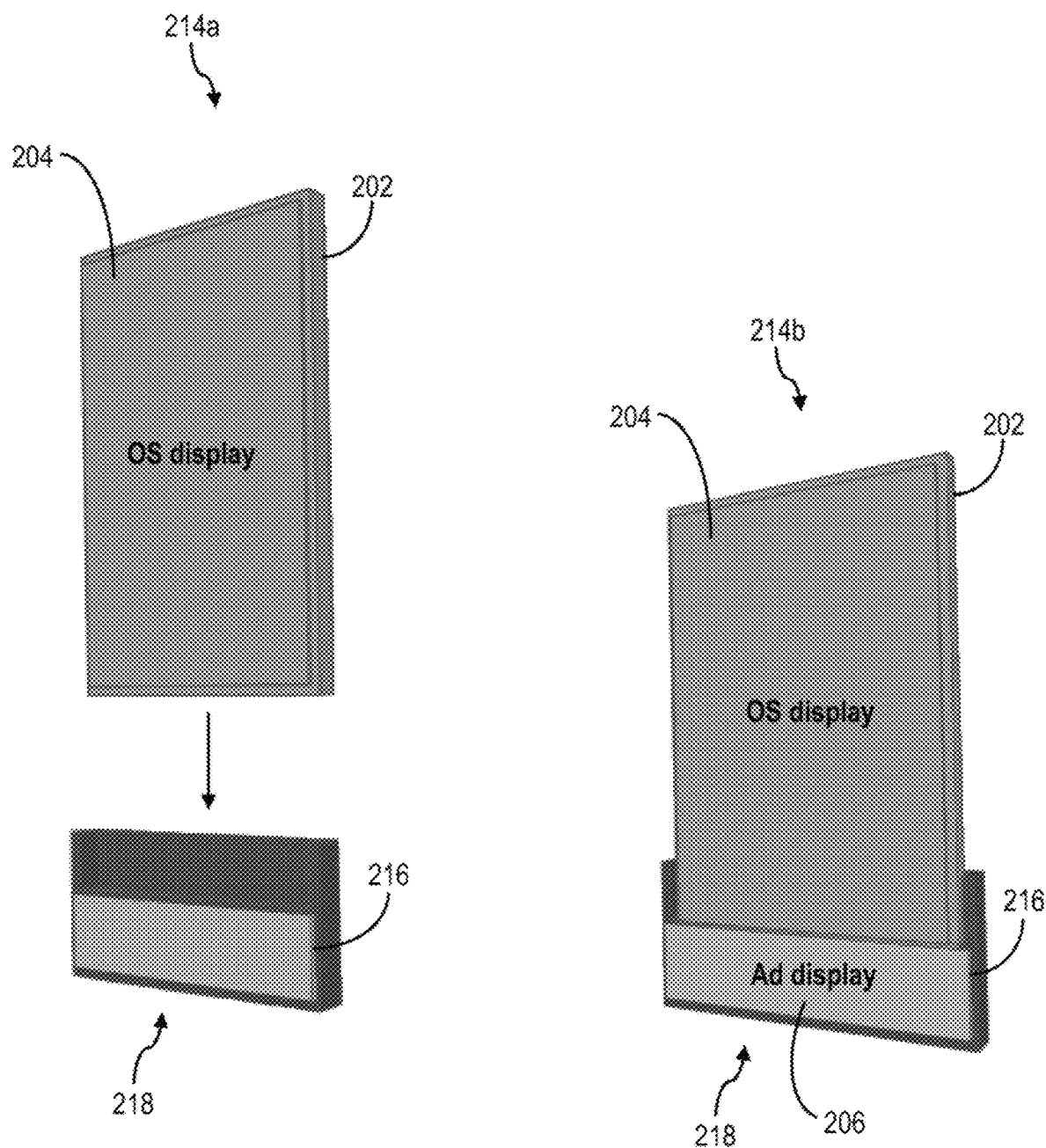
FIG. 2G is a diagram of a mobile device shown in relation to an auxiliary display device, according to an embodiment.

Referring to FIG. 2G, illustrated therein is a mobile device 214 shown in relation to an auxiliary display device (ADD) 218, according to an embodiment. The device 214, is shown in a detached configuration 214a and an attached configuration 214b. The device 214 includes a display 202. The entirety of the display 202 is used for the OS display 204. The ADD 218 includes an auxiliary display 216, the entirety of which is used for the ad display 206. The auxiliary display 216 may be a touchscreen. The ad display 206 may become active once the device 214b is connected/attached to the ADD 218.

In the attached configuration 214b, the ADD 218 has a data connection to the device 214 using, for example, Bluetooth, Universal Serial Bus (USB, or USB-OTG), or Near Field Communications (NFC), or other proprietary connection. The ADD 218 may be battery powered, for example, if the ADD 218 connects to the device 214 by Bluetooth. If the connection is over USB, the ADD 218 may not include a battery and may draw power from the device 214 via the USB connection.

The ADD 218 display technology and pixel size will be determined by ad requirements for static or dynamic images and color depth and user experience. Use of the ADD 218 may be particularly advantageous in cases where the device 214 does not or will not allow (by design of the OS, home screen manager, or rules on what type of applications will be approved) an advertisement to be displayed while the display 202 is on.

The ADD 218 may be provided as a "dock" for the device 214, wherein the auxiliary display 216 is disposed on a surface of the ADD 218 (as shown). According to another embodiment, the ADD 18 may be integrated into a phone folding case, cover, or the like, where when the case is opened in a book-like manner, one side is the OS display 204, and the other side is the ad display 206. According to yet another embodiment, the ADD 218 may be incorporated into a traditional case/holder originally designed to prevent phone damage when dropped, wherein the auxiliary display 216 may extend from either the top, the bottom or the side of the case to show the ad display 206 suitable in size for ad content.

Now referring to FIGS. 2B-2G, the ad display 206 may be positioned below the OS display 204 (FIGS. 2B, 2D, 2G), above the OS display 204 (FIG. 2C), or beside the OS display (FIG. 2D, 2E), such that the ad display 206 and OS display 204 may be viewed simultaneously by a user looking at the OS display 204. Each device 210, 220, 230 may be configured to switch the position of the ad display 206 relative to the OS display 204 according to user preference. The OS display 204 and the ad display 206 may be rendered by the same GPU/chipset within the device (i.e., device 210, 212, 220, 230 or 240) or multiple GPUs/chipsets (i.e., device 214, 216).

The ad display 206 displays "non-app generated" ads independent of the OS display 204, and do not interfere with operation and use of the OS display 204. That is, the ads displayed on the ad display 206 do not appear within the visual confines of an app (as with conventional advertising in FIG. 1) and are displayed completely independent of the content displayed on the OS display 204. Since the ad display 206 is independent of the OS display 204, the ad display 206 may remain switched on even if the OS display 204 is switched off, or in a "sleep" or "locked" mode. As such, the ad display 206 may display ads exclusively when the OS display 204 is not in use. According to an embodiment, when the devices 210, 220 are in locked mode, ad display 206 may be shown at both end segments (i.e., end segments 201a, 201b in FIG. 2A) of the display 202.

The mobile devices 210, 220 shown in FIGS. 2B-2C may offer several advantages over conventional mobile devices. By designating 2:9 of the display 202 for the ad display 206, ads may be displayed more prominently, and for longer duration than in conventional "in-app generated" ads (FIG. 1) or other kinds of digital advertising (e.g., conventional banner ads or search ads). Another benefit is that the device 210, 220 may be configured such that ads shown on the ad display 206 cannot be closed, blocked or scrolled away from. Yet another benefit is that ads may be displayed where ads are typically not displayed on a mobile device, for example on a "home screen" or a "lock screen." Such screens are typically generated and displayed by the operating system of the device 210, 220, and the display of ads via the ad display 206 can be implemented independent of the operating system to render an ad display 206 on the home screen and/or lock screen. Other content normally displayed on the home screen or lock screen may be moved to accommodate the ad display 206.

A further benefit is that by having a dedicated ad display area (ad display 206), the need for displaying ads in the OS display 204 is reduced or eliminated (i.e., ads that would have appeared on the OS display 204 may be moved to the ad display 206). This may reduce clutter in the OS display 204 so that apps may be viewed in their entirety without ads taking up space that would otherwise display app content. Further, ads themselves may be displayed (and viewed) unobtrusively for longer on the ad display 206.

By displaying ads continuously on the ad display 206, ad viewability can be increased and the chances of a user actually seeing and responding to ads can also be increased. This may provide incentive for vendors to advertise more and pay higher rates for advertisement space/time. Furthermore, the revenue generated by advertisements may be used to offset the cost of the mobile devices 210, 212, 216, 220, 230, 240 or usage plan, and may allow a customer to purchase a device/usage plan for less if they agree to provide personal information to be used in the display of targeted ads, such as described below with reference to FIG. 5.

Figure 2H:
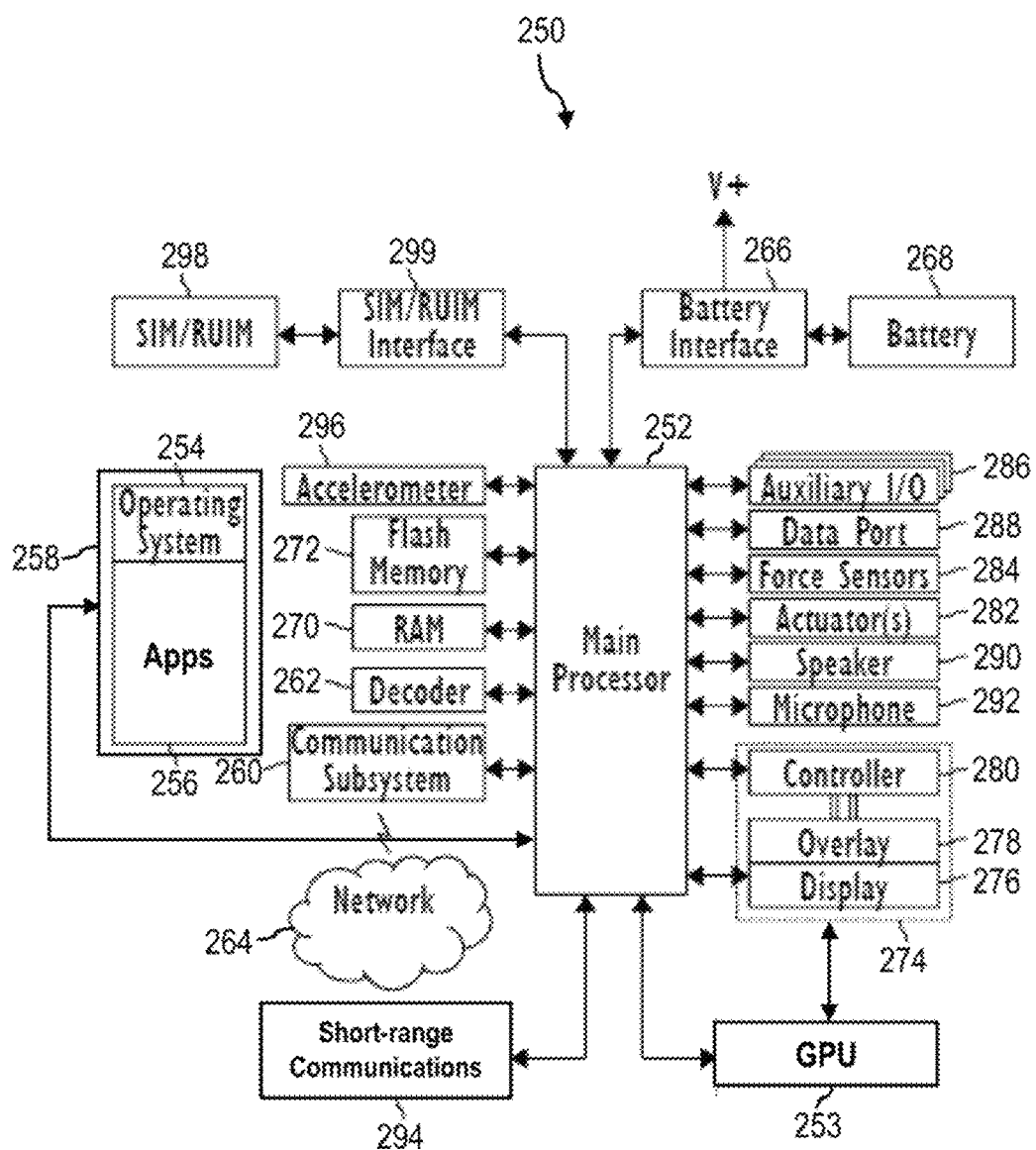
FIG. 2H is a block diagram of the components of a mobile device, according to an embodiment.

Referring to FIG. 2H, illustrated therein is a simplified block diagram of the internal components of a mobile device 250, according to an embodiment. The mobile device 250 may be the device 210, 212, 216, 220, 230, or 240 in FIGS. 2B-2G.

The mobile device 250 includes a processor 252 that controls the operations of the mobile device 250. The mobile device 250 also includes an operating system 254 and software components (Apps) 256 that are executed by the processor 252 and which may be stored in a persistent data storage device 258. The storage device 258 may also store ads (not shown). Alternatively, the operating system 254 and/or Apps 256 may be stored in a flash memory 272.

Preferably, the operating system 254 is Android™. The Android system architecture and framework is implemented in >50% of the mobile devices in use today. Hardware vendors typically modify the Android System Development Kit (SDK) to develop software for differentiating features, for example, different display technologies and sizes, or for new wireless standards or country dependent requirements. Accordingly, the Android framework may be leveraged to configure the mobile device 250 to split the display 276 into OS display and ad display segments.

Communication functions, including data communications, voice communications, or both may be performed through a communication subsystem 260. Data received by the mobile device 250 may be decompressed and decrypted by a decoder 262. The communication subsystem 260 may receive messages from and send messages to a wireless network 264.

The wireless network 264 may be any type of wireless communications network, including, but not limited to, data-centric wireless networks, voice-centric wireless networks, and dual-mode networks that support both voice and data communications.

The mobile device 250 may be a battery-powered device and as shown includes a battery interface 266 for receiving one or more rechargeable batteries 268.

The processor 252 also interacts with additional subsystems such as a Random Access Memory (RAM) 270, a flash memory 272, a display 276 (e.g. with a touch-sensitive overlay 278 connected to an electronic controller 280 that together comprise a touch screen display 274), an actuator assembly 282, one or more optional force sensors 284, an auxiliary input/output (I/O) subsystem 286, a data port 288, a speaker 290, a microphone 292 and short-range communications systems 294 (i.e. Bluetooth®, NFC, etc.).

In some embodiments, user-interaction with the graphical user interface may be performed through the touch-sensitive overlay 278. The processor 252 may interact with the touch-sensitive overlay 278 via the electronic controller 280. Information, such as text, characters, symbols, images, icons, and other items that may be displayed or rendered on a computing device generated by the processor 252 may be displayed on the touch screen 274.

The processor 252 may also interact with an accelerometer 296. The accelerometer 296 may be utilized for detecting direction of gravitational forces or gravity-induced reaction forces.

To identify a subscriber for network access according to the present embodiment, the mobile device 250 may use a Subscriber Identity Module (SIM)/Removable User Identity Module (RUIM) card 298 inserted into a SIM/RUIM interface 299 for communication with a network (such as the wireless network 264). Alternatively, user identification information may be programmed into the flash memory 272 or performed using other techniques.

Applications may be loaded onto the mobile device 250 through the wireless network 264, the auxiliary I/O subsystem 286, the data port 288 or the short-range communications subsystem 294.

In use, a received signal such as a text message, an e-mail message, web page download, or other data may be processed by the communication subsystem 260 and input to the processor 252. The processor 252 then processes the received signal for output to the display 276 or alternatively to the auxiliary I/O subsystem 286. A user may also compose data items, such as e-mail messages, for example, which may be transmitted over the wireless network 264 through the communication subsystem 260.

For voice communications, the overall operation of the mobile device 250 may be similar. The speaker 290 may output audible information converted from electrical signals, and the microphone 292 may convert audible information into electrical signals for processing.

The mobile device 250 includes at least one graphics processing unit (GPU) 253. The GPU 253 interacts with the processor 252 and electronic controller 280 to render the display 276 output. For example, the GPU 253 may be configured by the processor 252 to render an image or video that is output to the display 276 via the controller 280. Generally, the GPU 253 renders the display 276 output as directed by the operating system 254 or an App 256 executed by the processor 252.

According to an embodiment, the GPU 253 may be configured, by the operating system 254 or an app 256, to render the display 276 in segments. For example, the GPU may render ads in a first segment of the display 276 while simultaneously rendering display output as directed by the operating system 254 or apps 256 in a second segment of the display 276 (e.g., as shown in FIGS. 2B, 2C, 2D).

According to other embodiments, wherein the device 250 includes multiple touch screen displays 274 each having their own electronic controller 280, touch overlay 278 and display 276 (e.g., as shown in FIGS. 2E and 2G), the GPU 253 may be configured to render the output of each display 276. According to other embodiments, the device 250 may include multiple GPUs 253, whereby a separate GPU is used to render the display output of each touch screen display 274.

Figure 3A:
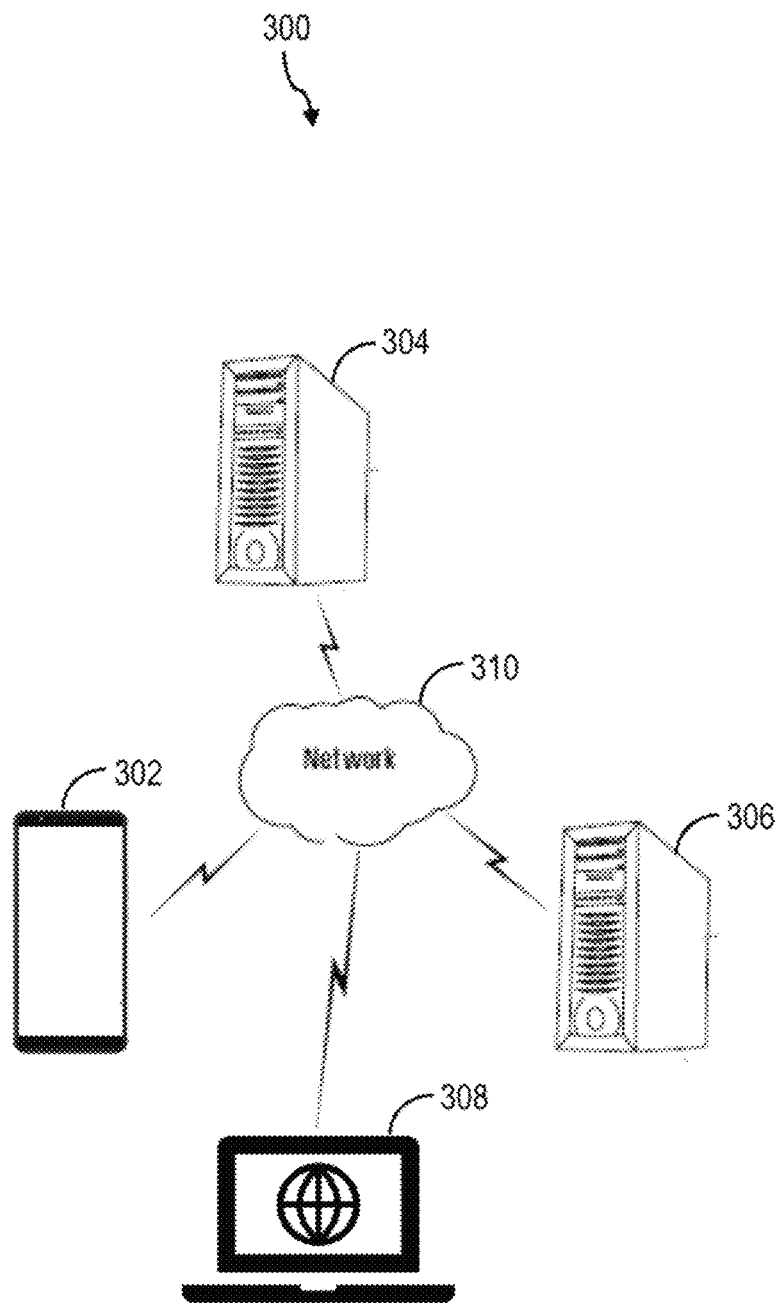
FIG. 3A is a diagram of a system for symbiotic display of ads on mobile devices, according to an embodiment.

Referring to FIG. 3A, illustrated therein is a diagram of a system 300 for symbiotic display of ads on mobile devices, according to an embodiment. The system 300 includes a mobile device 302 for use by an end user. The mobile device 302 is a smart phone or tablet having a screen. The screen may be a touchscreen. The mobile device 302 is installed with a native app or operating system (e.g., native app 374 of FIG. 3B) for displaying ads constantly on the device 302. The device 302 may be the device 210, 220, 212, 230, 240 or 216 in FIGS. 2B-2G. According to other embodiments, the system 300 may include a plurality of mobile devices 302.

The system 300 includes a vendor device 308. The vendor device 308 is a computer or tablet running a vendor application. The vendor application may be a native vendor app or web-based vendor application. The vendor application includes a mobile ad software development kit (SDK), a mobile application programming interface (API) and a user interface to create, edit, manage and view advertisements. The vendor device 308 is used by an advertiser (i.e., a vendor) to create and upload ads to a cloud server 304. The vendor device 308 connects to the cloud server 304 via the native vendor app or the web-based application. According to other embodiments, the system 300 may include a plurality of vendor devices 308.

The system 300 includes a cloud server 304. The cloud server 304 stores ad content. Ad content may include various forms of digital content such as, for example, audio, images, or videos uploaded by vendors. Ad content stored by the cloud server 304 is pushed to the mobile device 302 to display ads to the end user. The cloud server 304 hosts one or more internet services (cloud-based services) 312.

The system 300 includes a backend server 306. The backend server 306 hosts a plurality of cloud services for creating, storing and transmitting ads. The backend server 306 hosts cloud services for tracking and analyzing user click through of ads displayed on the mobile device 302. According to an embodiment, the backend server 306 may comprise one or more servers 306 that are operably connected.

The system 300 includes a communications network 310. The devices 302, 308 and servers 304, 306 include a connection with the network 310 such as a wired or wireless connection to the Internet. In some cases, the network 310 may include other types of computer or telecommunication networks. The network 310 may be a wide area network (WAN). The network 310 may be a private network, such as a virtual private network (VPN). The network 310 may be a software-defined WAN. The network 310 may be a wireless telecommunications network. The communications network 310 may be the communications network 264 in FIG. 2H.

The servers 304, 306 may be configured to receive a plurality of information, from each of the devices 302, 308 and from each other. Generally, the information may comprise at least an identifier identifying the device 302, 308. For example, the information may comprise one or more of a device identifier, username, e-mail address, password, social media handle, or the like.

The devices 302, 308 and servers 304, 306 may include one or more of a memory, a secondary storage device and a processor. Memory may include random access memory (RAM) or similar types of memory. Also, memory may store one or more applications for execution by processor. Applications may correspond with software modules comprising computer executable instructions to perform processing for the functions described below, for example cloud services. Secondary storage device may include a hard disk drive, floppy disk drive, CD drive, DVD drive, Blu-ray drive, or other types of non-volatile data storage. The processor may execute applications, computer readable instructions or programs. The applications, computer readable instructions or programs may be stored in memory or in secondary storage, or may be received from the Internet or other network.

The devices 302, 308 include an input device/interface, and a display device/interface. Input device/interface may include any device for entering information into the device 302, 308. For example, input device/interface may be a keyboard, keypad, cursor-control device, touchscreen, camera, or microphone. Display device/interface may include, for example, a computer monitor, a flat-screen display, touch screen, a projector or a display panel. In some cases, devices 302, 308 and servers 304, 306 may include multiple of any one or more of processors, applications, software modules, second storage devices, network connections, input devices, output devices, and display devices.

Although components 302, 304, 306, 308 are described with various components, one skilled in the art will appreciate that the devices 302, 304, 306, 308 may in some cases contain fewer, additional or different components. In addition, although aspects of an implementation of the components 302, 304, 306, 308 may be described as being stored in memory, one skilled in the art will appreciate that these aspects can also be stored on or read from other types of computer program products or computer-readable media, such as secondary storage devices, including hard disks, floppy disks, CDs, or DVDs; a carrier wave from the Internet or other network; or other forms of RAM or ROM. The computer-readable media may include instructions for controlling the components 302, 304, 306, 308 and/or processor to perform a particular method.

In the description that follows, devices such as servers 304, 306, mobile device 302 and vendor device 308 are described performing certain acts. It will be appreciated that any one or more of these components 302, 304, 306, 308 may perform an act automatically or in response to an interaction by a user of that device. That is, the user of the device 302, 308 may manipulate one or more input devices (e.g., a touchscreen, a mouse, or a button) causing the component 302, 304, 306 or 308 to perform the described act. In many cases, this aspect may not be described below, but it will be understood.

As an example, it is described below that the devices 304, 308 may send information to the servers 304, 306. For example, a user using the mobile device 302 may manipulate the touch screen to interact with an ad displayed on the touch screen of the mobile device 304. Generally, the device 304 may receive the ad from cloud server 304 via the network 310. Alternatively, or in addition, the ad may be stored locally on the mobile device 304 (i.e., in a cache of a mobile application running on the device 304).

Figure 3B:
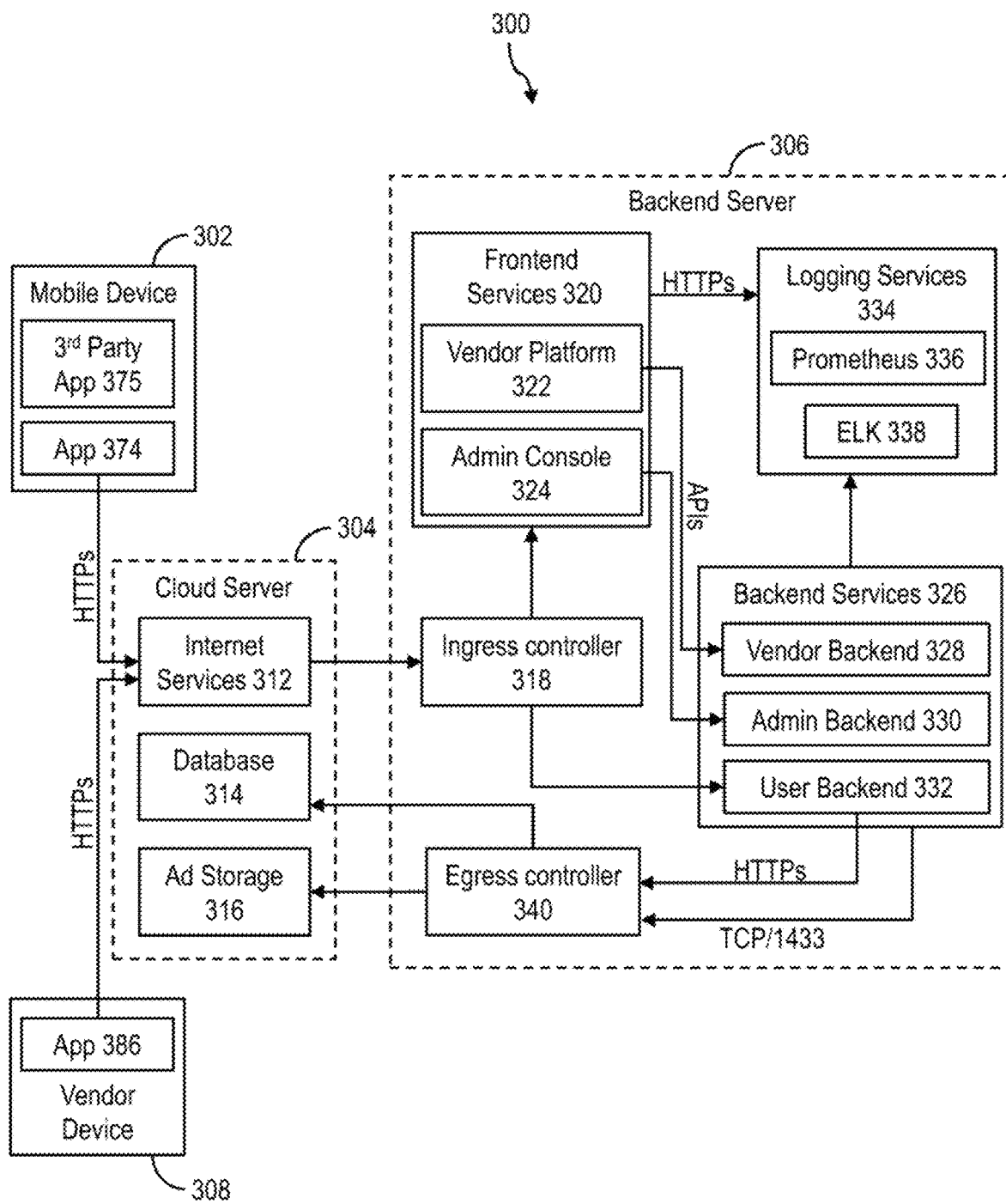
FIG. 3B is a block diagram showing components of the system of FIG. 3A.

Referring to FIG. 3B, illustrated therein is a detailed block diagram of the system 300 showing various modules hosted by the cloud server 304 and the backend server 306.

The cloud server 304 hosts internet services 312. The internet services 312 provide security to the system 300 from distributed denial of service (DDOS) attacks and ensure that allowed data traffic from mobile devices 302 and vendor devices 308 is routed through the cloud server 304 to the backend server 306. The internet services 312 may be, for example, IBM™ cloud internet services.

The cloud server 304 includes a database 314. The database 314 stores a plurality of user information sent from the devices 302, 308. The information may be entered or collected by the native app 374 installed on the mobile device 302 and received and stored by the database 314. For example, the database 314 may store a mobile device 302 user's personal data including, first name, last name, address, email, phone number, interests, location data, user interactions and statistics, ads viewed, ad click through rate, etc. The personal data may be stored and discarded according to user approval/consent and data retention laws in the jurisdiction where the system 300 is implemented. Information may be entered or collected by the vendor device 308 and received and stored by the database 314. For example, the database 314 may store a vendor's company name, address, email, phone number, etc.

Generally, the database 314 may be any suitable storage device such as a hard disk drive, a solid state drive, a memory card, or a disk (e.g., CD, DVD, or Blu-ray etc.). The database 314 may be locally connected with cloud server 304. According to some embodiments, the database 314 may be located remotely from cloud server 304 and operably connected to the cloud server 304 over a network. According to some embodiments, the database 314 may comprise one or more storage devices located at a networked cloud storage provider.

The database 314 may be PostgreSQL. The database 314 may include hashing for security. For example, confidential user details such as passwords are hashed using Bcrypt (PHP Laravel authentication). The database 302 may be encrypted with AES-256-CBC to further protect against unauthorized access. For example, the database 302 may be compliant to SOC 2 Type 2 Certification, ISO 27017, ISO 27018, General Data Protection Regulation (GDPR), HIPAA Security and Privacy Rule requirements.

The cloud server 304 includes ad storage 316. The ad storage 316 may be a cloud object storage for unstructured data. The ad storage 316 may store ad content that is uploaded from vendor devices 308 such as: text, images, GIFs, audio, video, PDFs compressed data archives, backup images, application artifacts, business documents, or any other binary object. Files stored within the ad storage 316 are encrypted using data encryption keys (DEKs) to protect access to the vendor ad content.

Figure 3C:
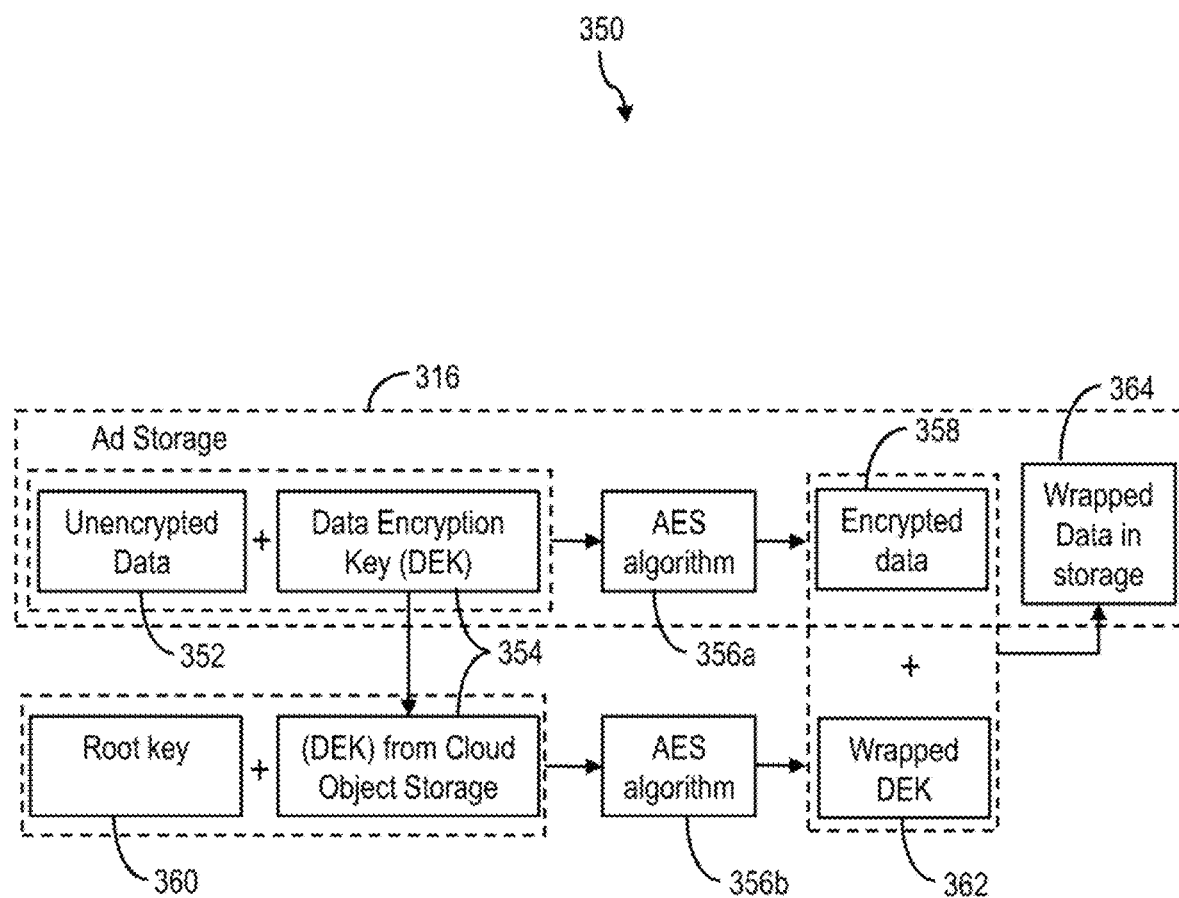
FIG. 3C is a block diagram of an encryption protocol, according to an embodiment.

Referring to FIG. 3C, illustrated therein is a diagram of an encryption protocol 350, according to an embodiment. The encryption protocol 350 may be employed to encrypt files stored in ad storage 316. Unencrypted data 352 and a DEK 354 are combined and encrypted using an advanced encryption standard (AES) algorithm 356a to form encrypted data 358. Concurrently, a root key 360 is combined with the DEK 354 and encrypted using the AES algorithm 356b to form a wrapped DEK 362. The encrypted data 358 is combined with the wrapped DEK 362 and stored as wrapped data 364 in the ad storage 316.

Referring to FIGS. 3B and 3C, as data is moved into ad storage 316, the system 300 automatically encrypts the unencrypted data 352 according to the encryption protocol 350. The DEK 356 is stored in the ad storage 316 securely, near the encrypted data 358 that it encrypts.

The root key 360 is unique to each vendor. Data is stored in the ad storage 316 in "buckets" that are created by vendors, wherein each bucket has an associated root key 360 such that only the vendor that creates the bucket may access it using the associated root key 360. To access encrypted wrapped data 364 in ad storage 316 the system 300 checks the credentials of the vendor against bucket policies to selectively grant permissions to vendors (and applications running on vendor devices 308) and decrypts the objects using the wrapped DEK 362 containing the root key 360 of the vendor. Data exchanged between the vendor device 308 and the ad storage 316 is securely uploaded/downloaded using HTTPS protocol SSL endpoints.

Referring again to FIG. 3B, the system 300 includes the backend server 306. For simplicity, the service modules 320, 326, 334 of the backend server 306 are illustrated as being hosted by the same backend sever 306. According to other embodiments, the service modules 320, 326, 334 may be hosted by separate servers that are operably connected over a network.

The backend server 306 may implement a microservices approach. In an embodiment, the backend server 306 is based on the Kubernetes™ open-source architecture for hosting a plurality of cloud-based applications following the microservices approach, wherein frontend and backend applications are separate interdependent entities. Services in a microservice architecture (MSA) implemented by the backend server 306 may be processes that communicate over a network to fulfill a goal using technology-agnostic protocols such as HTTP (and APIs in the present case). A microservice is not a layer within a monolithic application (example, the web controller, or the backend-for-frontend). Rather, a microservice is a "pod" or self-contained piece of functionality with clear interfaces, and may, through its own internal components, implement a layered architecture.

Services in a microservice architecture implemented by the backend server 306 may be independently deployable. Services can be implemented using different programming languages, databases, hardware and software environment, depending on fit and preference. As such, services may be relatively small in size, messaging-enabled, bounded by contexts, autonomously developed, independently deployable, decentralized and built and released with automated processes.

The backend server 306 includes a frontend services module 320. Frontend services are user-facing applications that may be accessed by vendors and system administrators. Frontend services include a vendor platform 322 and an admin console 324. The vendor platform 322 and admin console 324 are separate applications running on separate Kubernetes pods.

The vendor platform 322 may be used by vendors to create, edit and store ads. Using the vendor platform 322, a vendor may enter criteria for pushing ads to mobile device 302 and displaying an ad to a mobile user. For example, the criteria may specify a geographic region in which to display the ad or dates or a time of day at which to display the ad. Using the vendor platform 322 a vendor may tag an ad with location tags or keyword tags for matching with user's location data and search keywords. Keyword tags may correspond to user interests or behaviors. Using the vendor platform 322, vendors may book time slots to display their ads and/or bid on ad space and time slots to display their ads.

The admin console 324 may be used by system administrators to manage the system 300, including vendor access and permissions.

The backend server 306 includes a backend services module 326. The backend services are backend processes for supporting the user-facing frontend services 320. Backend services include a vendor backend 328, an admin backend 330 and a user backend 332.

The vendor backend 328 includes instructions for creating and storing ads using the vendor platform 322. For example, the vendor backend 328 may include instructions for storing and retrieving encrypted files in the ad storage 316.

The admin backend 330 includes APIs for performing administrative functions, for example, creating/managing vendors, generating activity reports, approving ad content created by vendors and updating user interest categories.

The user backend 332 includes instructions for receiving and storing mobile device 302 user information such as personal information and location information in the database 314. Information passed between the mobile device 302 and the cloud server 304 is secured and recorded in a blockchain. If security of the information cannot be guaranteed (i.e., cannot be recorded in the blockchain because there is no connection between the mobile device 302 and cloud server 304) the information is discarded. The user backend 332 includes instructions for periodic (e.g., daily, regular) syncing of ads stored in ad storage 316 to the local storage of the mobile device 302. This allows for ads to be displayed in an offline manner on the mobile device 302 when connections to the backend server 306 are down.

The frontend services 320 communicate securely via API gateways when fetching or pushing data to their respective backend services 326. API gateways provide security at different levels ranging from token authorization to network security policies which prevent anyone except the API gateway from being the contact point. For example, the frontend services 320 makes REST calls via the API gateway. Similarly, the backend services 326 accepts REST API calls from the API gateway through token and network security policies in-place. These APIs are private and not available to the outside world. Thus, by use of the APIs, data may be retrieved/pushed to the database 314 for PostgreSQL, outside the Kubernetes cluster (i.e., outside the backend server 306) but within the same virtual network, minimizing latency and securing accessibility.

If frontend services 320 are down, the backend services 326 may still be reached via the API gateways. At least two (2) API gateways may be open at a given time in case of downtime or maintenance.

The backend server 308 includes a routing ingress controller 318. The routing ingress controller 318 directs traffic from the mobile device 302 and vendor device 308 to the appropriate service module 320, 326. For example, data pushed from the native app 374 installed on the mobile device 302 is routed from the internet services module 312 to the backend services module 326.

Similarly, data pushed from the native app 386 (or web-based application) on the vendor device 308 is routed from the internet services module to a vendor dashboard unit 322 of the frontend services 320. The routing ingress controller 318 may also direct traffic from an administrator device (not shown) to the admin console 324.

The ingress controller 318 directs the data traffic from the devices 302, 308 to the correct service based on a URL. In the case of downtime (for example, if the frontend services are down), the ingress controller 318 may automatically traffic the data load to backend services 326. All communications are established with HTTPs.

The backend server 306 includes an egress controller 340. The egress controller 340 directs data traffic from backend services 326 to database 314 and ad storage 316 based on a URL. Communications are established with HTTPs.

The backend server 306 includes a logging services module 334. The logging services module 334 includes error logging/tracking applications to aid administrators in debugging the system 300. The logging services module 306 includes an elastic search stack (ELK) 338 and Prometheus toolkit 336. The Prometheus toolkit 336 is an open-source toolkit for logging HTTP response times, status codes and other HTTP-related errors. The Prometheus toolkit 336 may thus be used to provide feedback on user experience and communication issues if they arise. The ELK 338 includes instructions to log application-level information that is viewable through the admin console 324.

Figure 3D:
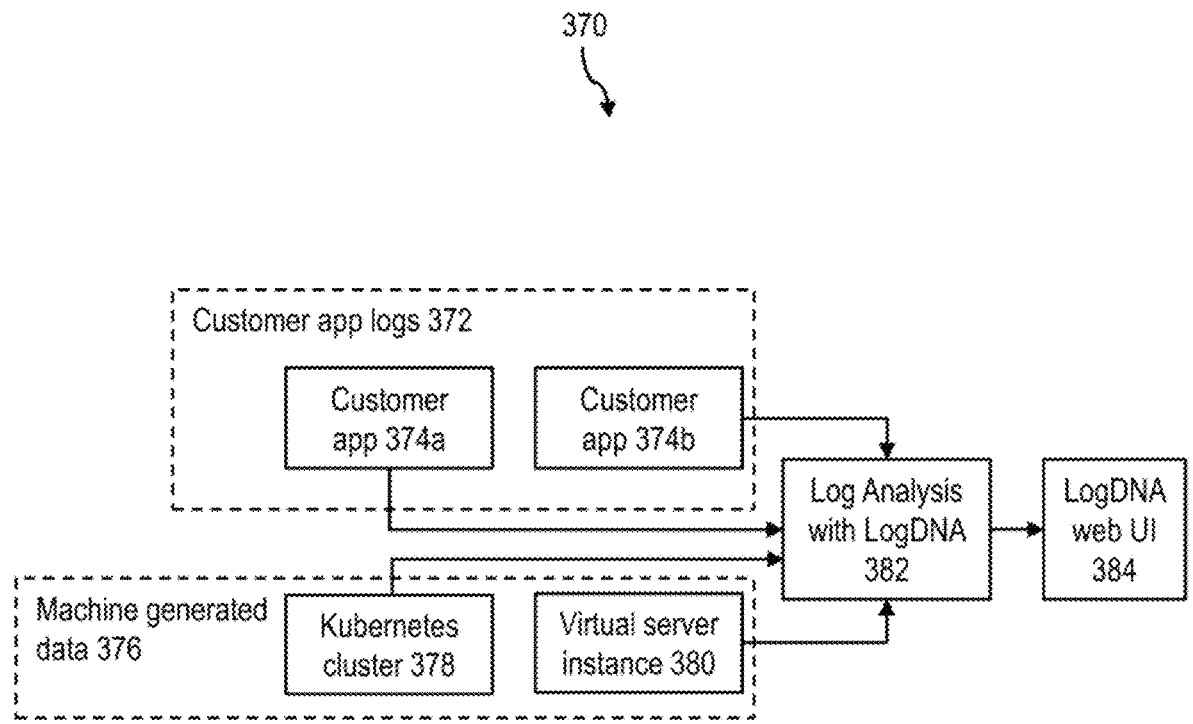
FIG. 3D is a flow chart showing aggregation and logging of application level information, according to an embodiment.

Referring to FIG. 3D, illustrated therein is a flow chart 370 showing aggregation and logging of application-level information, according to an embodiment. The aggregation and logging may be performed by the logging services module 334 in FIG. 3B. Customer app logs 372 that include logs from individual customer apps 374a, 374b (i.e., native apps 374 installed on mobile devices 302) are recorded by the ELK 338. Machine generated data 376 including data from the Kubernetes cluster 378 (i.e., the backend server 306) and virtual server instance 380 are recorded by the Prometheus toolkit 336. The customer app logs 372 and machine generated data 376 are fed into LogDNA™ 382 for sorting and analysis. The analyzed data may then be viewed using the LogDNA web user interface 384.

Referring back to FIG. 3B, the native app 374 (or the operating system) on the mobile device 302, is configured to download ads from the backend system 306 and present the ads on an ad display (i.e., ad display 206 in FIGS. 2B-2E) of the mobile device 302.

According to an embodiment, the native app 374 may be configured to display ads from a third-party app 375 installed on the mobile device 302. That is, the ads that are normally presented within the confines of the third-party app 375, may be displayed on the ad display by the native app 374. This may be accomplished by, for example, providing an API for the native app 374 to receive an ad from the third-party app 375, whereby the third-party app 375 is registered with the backend system 306 and has the requisite permissions to call the API to display the third-party ad via the native app 374. Similarly, the native app 374 may be configured to display the third-party ad in the ad display. In this manner, third-party apps may be displayed on the ad display rather than on the OS display within the confines of the third-party app 375 itself.

Figure 4:
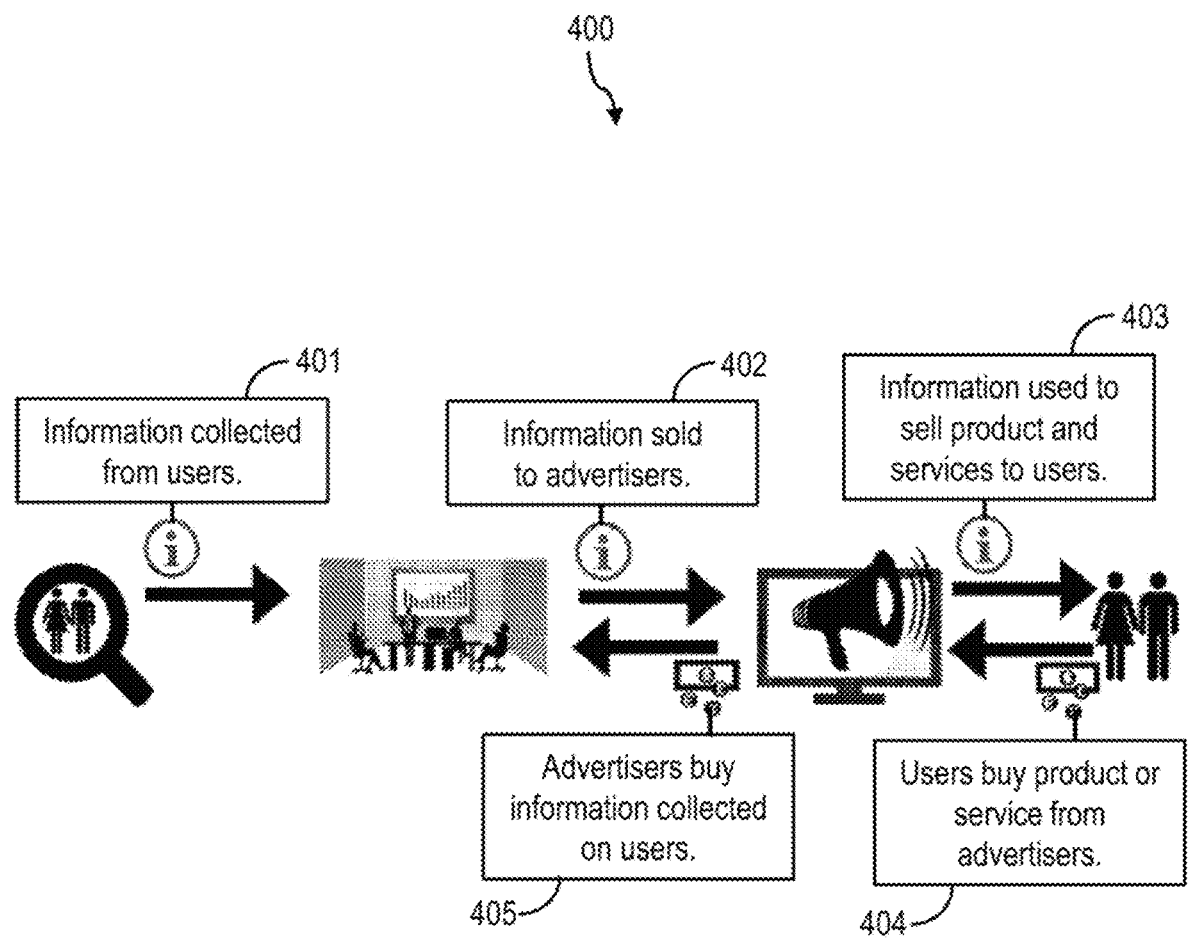
FIG. 4 is a diagram of a conventional model for targeted advertisement on mobile devices.

Referring to FIG. 4, illustrated therein is a diagram of a conventional model 400 for targeted advertisement on mobile devices. At 401, personal information is collected from a user (without or without the consent of the user). At 402, the information is sold to advertisers which is bought by advertisers at 405. At 403 advertisers analyze the information to market products or services to the users based on the information. At 404, users buy products or services from advertisers who then get paid by selling their products back to the user.

Thus, information is passed from all three parties, however only the advertisers and those collecting/aggregating data benefit monetarily. Consequently, the conventional model 400 is parasitic to the user who sees little, if any, tangible benefit from providing their information (even if provided consensually). Furthermore, in certain jurisdictions the conventional model 400 has come under scrutiny and may even be illegal if user consent is not obtained prior to collection and sale of personal information.

Figure 5:
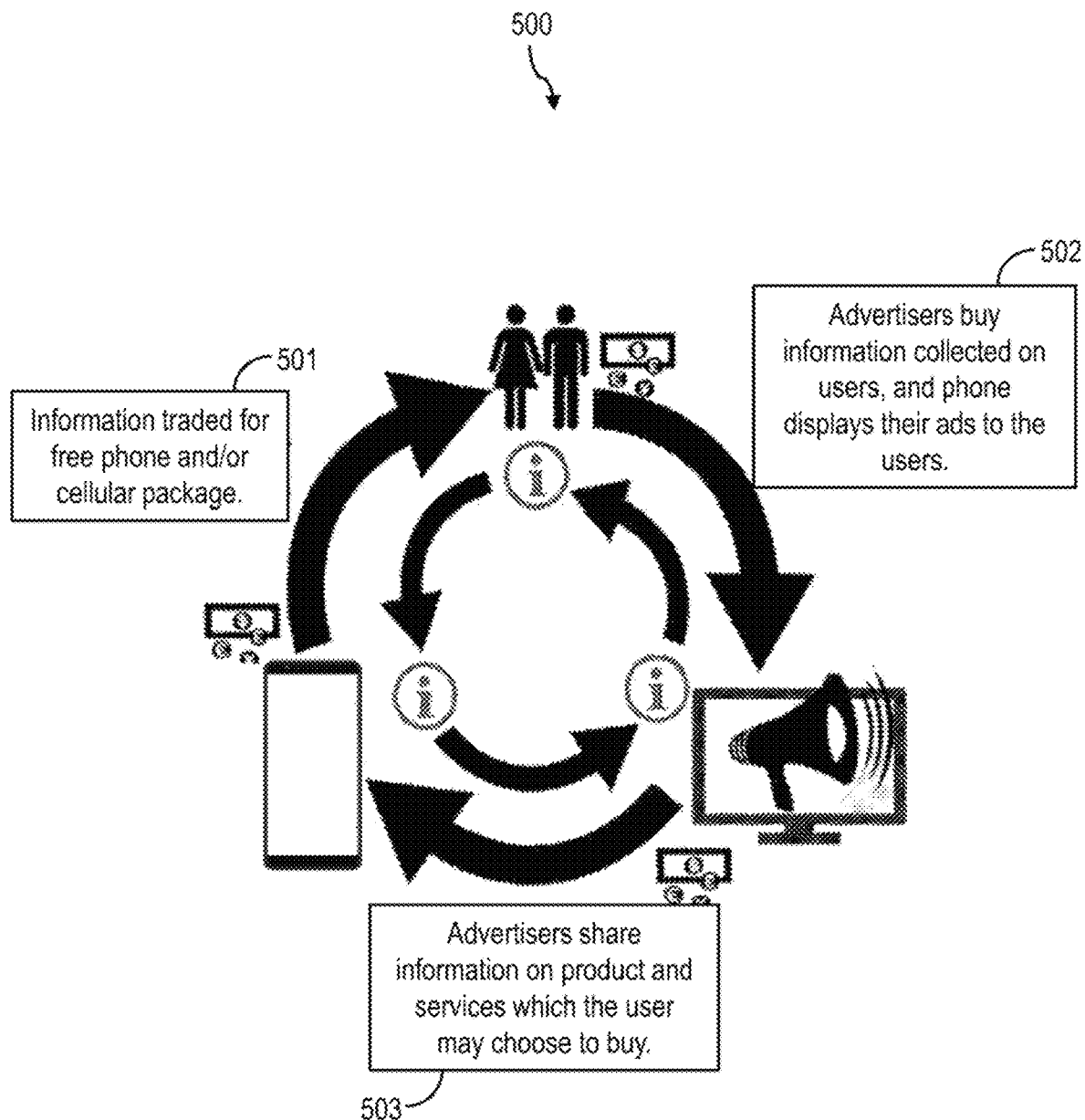
FIG. 5 is a diagram of a symbiotic model for advertisement on mobile devices, according to an embodiment.

Referring to FIG. 5, illustrated therein is a diagram of a symbiotic model 500 for advertisement on mobile devices, according to an embodiment. At 501 user's information is traded, by the user, for a "free" phone and/or cellular/data package. The user must consent to the trade of their information, and agree to be exposed to advertising, in exchange for something of value (a device or usage plan). The agreement to provide personal information may be an ongoing obligation for the duration of time the user has the device or as required by local data retention law. For example, the user may agree to the collection of location data at all times the device is turned on; or collection of all search terms entered in a web browser search. The personal information may be retained for a period of time and then discarded as required by local data retention law.

At 502, the device provider/manufacturer exchanges ad space and the user's information for monetary value to advertisers. Advertisers buy the user's information and ad space/time from the device provider. The device provider in turn, provides the device and/or purchases a usage plan for the user. The device provider may show the user the value of the monetary exchange and the price of the device and/or usage plan.

At 503, advertisers analyze the user's information and target ads and media content to sell products and services to the users who in turn have the option to buy these from the advertiser. The ads and media content may be targeted based on the geography, behavior and/or interests of the user as included in the user information.

Compared to the conventional model 400 in FIG. 4, the symbiotic model 500 is more transparent and beneficial to all parties involved. The user benefits from receiving a device or usage plan without having to pay any money. A further potential benefit to the user is they will be exposed to targeted, as opposed to random ads. For example, targeted ads may only advertise products/services that are available in the immediate geographic area the user is in.

The device/usage plan provider benefits from receiving revenue from the sale of information and ad space to advertisers (so long as this revenue exceeds the cost of the device/usage plan). The advertisers benefit from targeted and prominent advertisement to the user that they would otherwise not have. Furthermore, since the ad is targeted based on user information/preferences there is a higher chance the user will actually respond to the ad.

Figure 6:
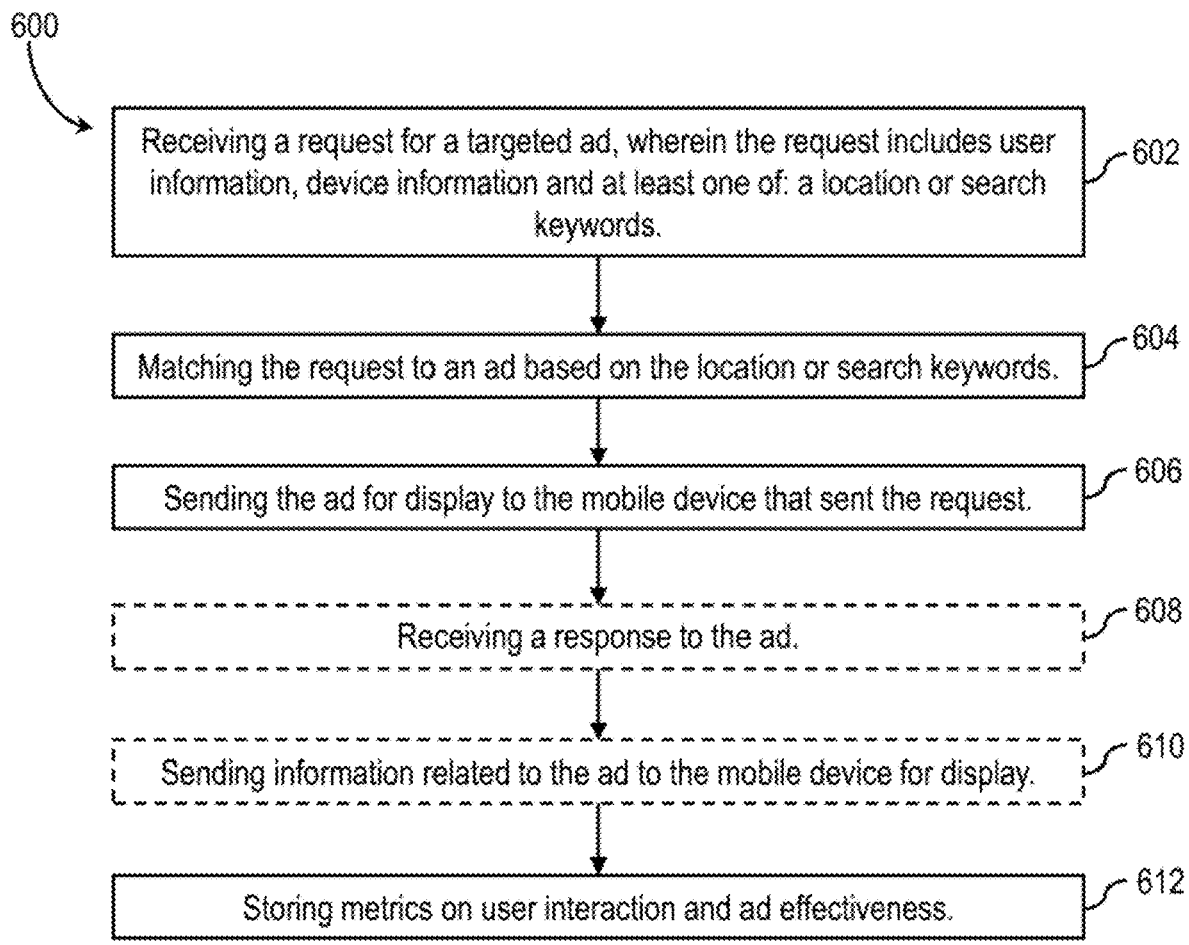
FIG. 6 is a flow chart of a method for displaying targeted ads on a mobile device, according to an embodiment.

Referring to FIG. 6, illustrated therein is a method 600 for displaying targeted ads on a mobile device, according to an embodiment. The method may be used in the symbiotic model 500 shown in FIG. 5 for targeting for advertisement on mobile devices. The method 600 may be implemented using the devices and components shown in FIGS. 2B and 3B. In the following description of method 600, the elements from FIGS. 2B and 3B are identified in parenthesis for reference.

At 602, a request for a targeted ad is received by the system (300). The request is generated automatically by a mobile device (302) upon collecting location data and/or queried search keywords. The queried search results may be stored and retrieved from a web browser application history. The request may be generated by a native app (374) running on the mobile device. The request may be received by the backend services module (326).

The request includes the device information of the mobile device (302), such as phone number, IP address, etc. The request includes user information of the user such as name and address. The request includes at least one of: location data or queried keywords from a search entered by the user of the mobile device (302). Queried keywords may be indicative of an interest or behaviour of the user.

At 604, the system (300) matches the request received at 602 with one or more vendor ads stored in the ad storage (316). The ad is matched to the request based on the location data or search keyword. For example, a vendor may tag an advertisement with a location tag or keyword tag. The user backend (332) is configured to search for ads tagged with location tags or keywords tags that match the location data and/or search keywords in the request.

At 606, an ad matching the request is sent to the mobile device that sent the request at 602. The matching ad can be considered "targeted" to the device (302) and the user based on the matching performed at 604. The matched ad is pushed to the mobile device (302) via the internet services module (312). According to some embodiments, an industry standard framework for delivering ad content to the device (302) may be employed by the internet services module (312). Standard frameworks include moPub, AdSense, AdMob, or the like. Alternatively, a custom framework may be developed using standard mobile device protocols and operating system APIs known to those skilled in the art.

The ad is displayed on the ad display (206) of the device (302) such that the ad appears constantly for a predetermined duration, or until the user of the device (302) responds to the ad. According to some embodiments, the ad may be presented audibly from one or more speakers on the device (302).

At 608, a response to the ad may be received. The user also has the option to not respond and is not bombarded by advertisements. Advertisements are provided in a non-intrusive manner to the regular operation of the phone, meaning advertisements may be delivered by default without sound. Thus, user interaction with the ad is completely voluntary and thus represents symbiotic advertisement in that advertisers' content and related information is only pushed to the user if a response is received. If the user of the device notices the ad and responds, for example, by a touch gesture on the ad display (206) interface, a response is transmitted to the backend (306).

At 610, information related to the ad is sent to the mobile device for display. The related information may be a URL link to purchase the product/service in the ad. The related information may be directions to a nearby store where the product is sold. The related information may be a review for the product/service. The related information may be audio and/or video that is displayed/output from the mobile device (302). The related information may be a coupon or deal for a product/service.

The related information may be displayed in the native app (374) installed on the mobile device (302), for example a web browser, map application or audio/video application. The related information may be displayed using the entirely of the display (202) including the ad display (206) and the OS display (204). Thus, the related information can use the entirety of the display (202) to present a full-screen video advertisement with sound. After displaying the related information, the display (202) reverts to its normal operation by displaying the OS display (204) and ad display (206) in their respective positions on the display (202) as shown in FIG. 2B.

At 612, the backend stores metrics related to the user interaction with the ad and the effectiveness of the ad itself. The following metrics may be stored: user click-through rate, time before responding to ad, whether a product/service was purchased, whether the ad was a targeted based on location or search keywords, whether the ad was a banner ad or a search ad, etc. The metrics/data that is stored may be monetized by selling to vendors for analysis. Similarly, a system administrator may analyze the metrics to determine best times, locations, keywords, etc. for selling advertising space and thus add appropriate mark-ups when selling advertising space to vendors.

Further at 612, the system (300) may track users benefits/rewards for interacting with ads. For example, a user may accumulate reward points for responding to an ad, purchasing an advertised product, etc. The system (300) may track reward points and advertise offers to redeem the points for products/services. The offers may be sent to the user by email, posted to a website, or through another ad that is displayed on the device (302).

Figure 7:
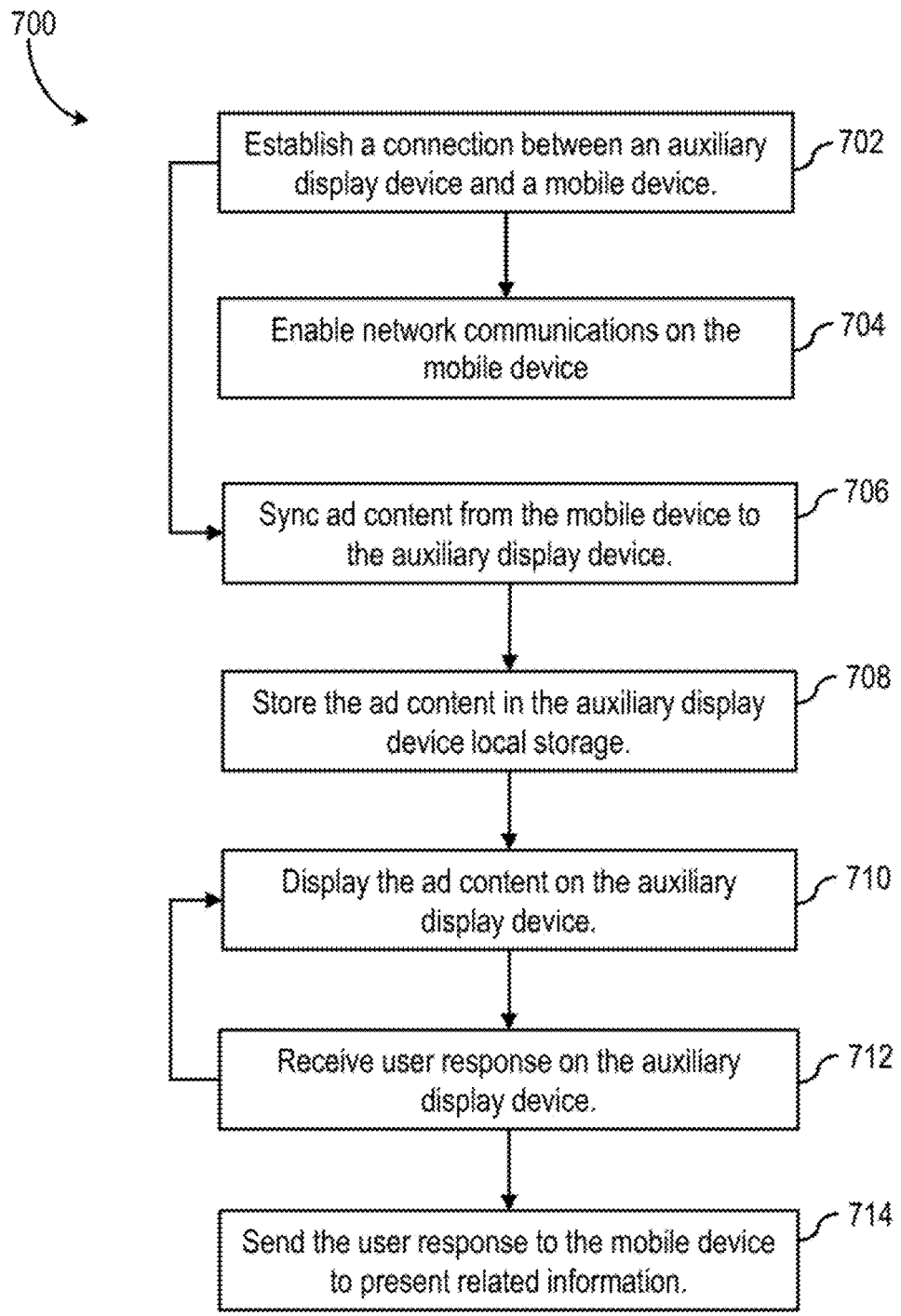
FIG. 7 is a flow chart of a method for displaying ad content on an auxiliary display device, according to an embodiment.

Referring to FIG. 7, shown therein is a flow chart of a method 700 for displaying ad content on an auxiliary display device, according to an embodiment. The method 700 may be implemented using the devices and components shown in FIGS. 2G and 2H. In the following description of method 700, the elements from FIGS. 2G and 2H are identified in parenthesis for reference.

At 702, a connection between an auxiliary display device (218) and a mobile device (214) is established. The connection may be a wireless connection (e.g., Bluetooth), or a wired connection (e.g., USB). For wired connections, the auxiliary display device (218) and the mobile device (214) may have complimentary ports/connectors to form the wired connection.

At 704, once the connection is established, the communication subsystem (260) of the mobile device (214) is enabled, allowing the mobile device (214) to connect to a wireless communication network for voice and/or data communications.

At 706, ad content is synchronized from the mobile device (214) to the auxiliary display device (218). The ad content may be pre-stored on the mobile device (214) or may be automatically downloaded by the mobile device (214) following Act 704. At 708, the ad content is stored in local storage on the auxiliary display device (218).

At 710, the ad content is presented on an ad display (206) on the auxiliary display device (214). The ad content may be continuously displayed on the ad display (206) independent of apps or content displayed on an OS display (204) of the mobile device (214).

At 712, a user response to the ad content is received by the auxiliary display device. The display (216) of the of the auxiliary display device (218) may be a touchscreen for receiving the user response. The user response is voluntary and may be prompted by the ad content shown on the auxiliary display device (218).

At 714, the user response and associated data are sent to the mobile device (214). The associated data may be related to ad content that solicited the user response, for example, a geographical tag in the ad content. The user response and/or the associated data automatically triggers the presentation of related information on the mobile device (214) OS display (204) in the same manner as Acts 610 and 612 in method 600.

While the above description provides examples of one or more apparatus, methods, or systems, it will be appreciated that other apparatus, methods, or systems may be within the scope of the claims as interpreted by one of skill in the art. The foregoing embodiments have been presented for the purpose of illustration only and are not intended to be exhaustive or to limit the invention to the precise embodiments disclosed. Modifications and alterations may be used in the design, manufacture, and/or implementation of other embodiments according to the present disclosure without departing from the spirit and scope of the invention.

The invention claimed is:

1. A system for symbiotic display of advertisements, the system comprising:
 a mobile device comprising:
  a first display for displaying content;
  a second display for displaying advertisements; and
  a communications subsystem for connecting the mobile device to a wireless communications network;
  wherein the mobile device is configured to:
   record consent to collect user information including location data and search keywords entered by a user of the mobile device;
   send the user information including the location data and the search keywords to a backend system over the wireless communications network;
   download one or more targeted advertisements from the backend system, wherein the one or more targeted advertisements are matched to the user information including the location data or the search keywords; and
   simultaneously present the one or more targeted advertisements on the second display, and the content on the first display, wherein the targeted advertisements are presented on the second display independent of the content on the first display, wherein simultaneously presenting the one or more targeted advertisements on the second display includes positioning the one or more targeted advertisements wherein the one or more targeted advertisements on the second display and the content on the first display are viewed simultaneously by the user;
   wherein the one or more targeted advertisements are encrypted by combining unencrypted data and a data encryption key (DEK) as a first combination, encrypting the first combination using a first advanced encryption standard algorithm (AES) to form encrypted data, combining a root key with the DEK as a second combination, encrypting the second combination using a second AES algorithm to form a wrapped DEK, and combining the encrypted data with the wrapped DEK as wrapped data.

2. The system of claim 1, wherein the mobile device is further configured to:
 send a user response to the targeted advertisements to the backend system;
 download related information to the targeted advertisement from the backend system based on the user response; and
 present the related information on either the first display or the second display.

3. The system of claim 1, where the content comprises: applications, application embedded advertisements, images, video, user interfaces and a display output of an operating system.

4. The system of claim 1, wherein the first display and the second display are simultaneously viewable during usage of the mobile device.

5. The system of claim 1, wherein the second display is removably connected to the mobile device.

6. The system of claim 1, wherein the second display is a touchscreen.

7. The system of claim 1, wherein the mobile device is further configured to:
 present advertisements on the second display when the first display is switched off.

8. The system of claim 1, wherein the mobile device is further configured to:
 display an application on the first display;
 identify an area of the first display used for displaying an application embedded advertisement;
 retrieve the application embedded advertisement from the application; and
 display the application embedded advertisement on the second display, thereby making available the entire area of the first display for displaying the application.

9. The system of claim 1, further comprising a vendor device connected to the backend system, wherein the vendor device is configured to:
- create an advertisement, wherein the advertisement is tagged with one or more keywords; and
- upload the advertisement to the backend system for storage.

10. The system of claim 1, wherein the backend system is configured to:
- store a plurality of advertisements, wherein each advertisement is tagged with one or more ad keywords;
- receive the user information including the location data and the search keywords from the mobile device over the communications network;
- identify one or more targeted advertisements from the plurality of advertisements, by matching ad keywords with the user information including the location data or search keywords; and
- send the one or more targeted advertisements to the mobile device.

11. A non-transitory computer-readable storage medium having stored thereon computer-executable instructions that, when executed by a processor of a mobile device, cause the mobile device to:
- record consent to collect user information including location data and search keywords entered by a user of the mobile device;
- send the user information including the location data and the search keywords to a backend system over a wireless communications network;
- download one or more targeted advertisements from the backend system, wherein the one or more targeted advertisements are matched to the user information including the location data or the search keywords; and
- simultaneously present the one or more targeted advertisements on a second display, and the content on a first display, wherein the targeted advertisements are presented on the second display independent of the content on the first display, wherein simultaneously presenting the one or more targeted advertisements on the second display includes positioning the one or more targeted advertisements wherein the one or more targeted advertisements on the second display and the content on the first display are viewed simultaneously by the user;
- wherein the one or more targeted advertisements are encrypted by combining unencrypted data and a data encryption key (DEK) as a first combination, encrypting the first combination using a first advanced encryption standard algorithm (AES) to form encrypted data, combining a root key with the DEK as a second combination, encrypting the second combination using a second AES algorithm to form a wrapped DEK, and combining the encrypted data with the wrapped DEK as wrapped data.

12. The non-transitory computer-readable storage medium of claim 11, having stored thereon further computer-executable instructions that, when executed by a processor of a mobile device, cause the mobile device to:
- receive a user response to the targeted advertisements;
- send the user response to the targeted advertisements to the backend system;
- download related information to the targeted advertisement from the backend system based on the user response; and
- present the related information on the first display or the second display.

13. The non-transitory computer-readable storage medium of claim 11, having stored thereon further computer-executable instructions that, when executed by a processor of a mobile device, cause the mobile device to:
- display an application on the first display;
- identify an area of the first display used for displaying an application embedded advertisement;
- retrieve the application embedded advertisement from the application; and
- display the application embedded advertisement on the second display, thereby making available the area of the first display for displaying the application.

14. The non-transitory computer-readable storage medium of claim 11, having stored thereon further computer-executable instructions that, when executed by a processor of a mobile device, cause the mobile device to:
- present advertisements on the second display when the first display is switched off.

15. The non-transitory computer readable storage medium of claim 11, having stored thereon further computer-executable instructions that, when executed by a processor of a mobile device, cause the mobile device to:
- establish a connection to an auxiliary display device, wherein the auxiliary display device includes the second display; and
- synchronize ad content to a local storage on the auxiliary display device for presentation on the second display.

16. The non-transitory computer readable storage medium of claim 15, having stored thereon further computer-executable instructions that, when executed by a processor of a mobile device, cause the mobile device to:
- receive a user response to the ad content from the auxiliary display device;
- send the user response to the backend system;
- download related information to the ad content from the backend system based on the user response; and
- present the related information on the first display or the second display.

* * * * *